(12) United States Patent
Ahn et al.

(10) Patent No.: US 12,344,092 B2
(45) Date of Patent: Jul. 1, 2025

(54) SMART MOBILITY VEHICLE

(71) Applicant: HYUNDAI MOBIS Co., Ltd., Seoul (KR)

(72) Inventors: Sung Joon Ahn, Seongnam-si (KR); Seung Hwan Lee, Hwaseong-si (KR); Tae Hun Kim, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 494 days.

(21) Appl. No.: 17/667,069

(22) Filed: Feb. 8, 2022

(65) Prior Publication Data

US 2022/0254284 A1    Aug. 11, 2022

(30) Foreign Application Priority Data

| Feb. 9, 2021 | (KR) | 10-2021-0018692 |
| Feb. 9, 2021 | (KR) | 10-2021-0018697 |
| Feb. 9, 2021 | (KR) | 10-2021-0018698 |

(51) Int. Cl.
*B60K 35/00* (2024.01)
*B60J 3/04* (2006.01)
(Continued)

(52) U.S. Cl.
CPC ............. *B60K 35/00* (2013.01); *B60J 3/04* (2013.01); *B60Q 1/50* (2013.01); *B62D 1/10* (2013.01);
(Continued)

(58) Field of Classification Search
CPC .......... G09G 3/002; G09G 2320/06; G09G 2340/0464; G09G 2380/10; B60J 3/04; B60J 1/20; B60K 35/00; B60K 35/23; B60K 35/231; B60K 35/60; B60K 35/81; B60K 2360/27; B60K 2360/334; B60K 2360/182; B60K 2360/186; B60K 2360/331; B60K 2360/785; B60K 35/22;
(Continued)

(56) References Cited

U.S. PATENT DOCUMENTS

| 10,166,996 B2* | 1/2019 | Ishihara | B60W 50/14 |
| 2010/0295670 A1* | 11/2010 | Sato | B60Q 3/12 340/458 |

(Continued)

FOREIGN PATENT DOCUMENTS

| CN | 108292045 A | 7/2018 |
| CN | 108621942 A | 10/2018 |

(Continued)

OTHER PUBLICATIONS

Chinese Office Action issued on Jan. 22, 2025, in corresponding Chinese Patent Application No. 202210122278.0. (19pages in English, 10pages in Chinese).

*Primary Examiner* — Magda Cruz
(74) *Attorney, Agent, or Firm* — NSIP Law

(57) ABSTRACT

A smart mobility vehicle includes a windshield including an electrochromic film having adjustable transparency based on power applied thereto, and a projector configured to project vehicle driving information onto the windshield, wherein the windshield comprises an internal display area and an external display area, the internal display area being configured to display an image toward an inside of the vehicle, the external display area being configured to display an image toward an outside of the vehicle.

19 Claims, 39 Drawing Sheets

(51) Int. Cl.
| | |
|---|---|
| *B60K 35/23* | (2024.01) |
| *B60Q 1/50* | (2006.01) |
| *B62D 1/10* | (2006.01) |
| *F21V 8/00* | (2006.01) |
| *G02B 27/01* | (2006.01) |
| *G02F 1/1334* | (2006.01) |
| *G02F 1/163* | (2006.01) |
| *G02F 1/166* | (2019.01) |
| *G03B 21/00* | (2006.01) |
| *G03B 21/14* | (2006.01) |
| *G03B 21/56* | (2006.01) |
| *G09G 3/00* | (2006.01) |

(52) U.S. Cl.
CPC ....... *G02B 6/0001* (2013.01); *G02B 27/0101* (2013.01); *G02B 27/0149* (2013.01); *G02F 1/1334* (2013.01); *G02F 1/163* (2013.01); *G02F 1/166* (2019.01); *G03B 21/00* (2013.01); *G03B 21/14* (2013.01); *G03B 21/56* (2013.01); *G09G 3/002* (2013.01); *B60K 35/23* (2024.01); *G02B 2027/0154* (2013.01); *G02F 2201/44* (2013.01); *G09G 2320/06* (2013.01); *G09G 2340/0464* (2013.01); *G09G 2380/10* (2013.01)

(58) Field of Classification Search
CPC . B60K 35/29; B60Q 1/50; B62D 1/10; G02B 27/0101; G02B 27/0149; G02B 2027/0154; G02B 6/0001; G02F 1/1334; G02F 1/163; G02F 1/166; G02F 2201/44; G02F 1/13306; B32B 2457/202; B32B 17/10005; B32B 17/10165; B60R 11/02; G03B 21/00; G03B 21/14; G03B 21/56
USPC .......................................................... 353/12
See application file for complete search history.

(56) References Cited

U.S. PATENT DOCUMENTS

| | | | |
|---|---|---|---|
| 2018/0086260 A1* | 3/2018 | Barillot | B60Q 1/268 |
| 2018/0157036 A1* | 6/2018 | Choi | G09G 3/001 |
| 2018/0224932 A1* | 8/2018 | Von Novak | G06F 3/013 |
| 2018/0264945 A1* | 9/2018 | Torii | G06V 20/56 |
| 2019/0232786 A1* | 8/2019 | Sasaki | B60K 35/00 |
| 2020/0410963 A1* | 12/2020 | Nagata | H04N 5/74 |
| 2022/0068199 A1* | 3/2022 | Helot | B60K 35/60 |

FOREIGN PATENT DOCUMENTS

| | | |
|---|---|---|
| DE | 10 2019 210 718 A1 | 1/2021 |
| EP | 3 670 228 A1 | 6/2020 |
| TW | M483194 U | 8/2014 |

* cited by examiner

COCKPIT MOVING STRUCTURE

324

324

BASIC VIEW AND PROJECTION POSITION

KID PASSENGER AND PROJECTION POSITION CHANGE

SMART MOBILITY VEHICLE

CROSS-REFERENCE TO RELATED APPLICATIONS

This application claims the benefit under 35 USC § 119(a) of Korean Patent Application Nos. 10-2021-0018692 filed on Feb. 9, 2021, 10-2021-0018697 filed on Feb. 9, 2021, and 10-2021-0018698 filed on Feb. 9, 2021, in the Korean Intellectual Property Office, the entire disclosures of which are incorporated herein by reference for all purposes.

BACKGROUND

1. Technical Field

The present disclosure relates to a smart mobility vehicle.

2. Related Art

According to the related art, a display within a vehicle has been gradually increased in size with the development in shape of the vehicle, and a technology for utilizing the entire area of the vehicle across a windshield and a window thereof as the display is being developed.

In the related art, however, when an image is displayed at fixed position, an occupant's view may be blocked depending on the build/position of the occupant (including a driver and a passenger). In this case, the occupant may not normally recognize information displayed in the image.

Furthermore, since a steering wheel which is adjusted in a top-to-bottom direction according to the build/position of the occupant has a limit within a fixed cockpit, there are difficulties in improving driving convenience only by adjusting the steering wheel.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

According to an aspect, there is provided an smart mobility vehicle including a windshield including an electrochromic film having adjustable transparency based on power applied thereto, and a projector configured to project vehicle driving information onto the windshield, wherein the windshield includes an internal display area and an external display area, the internal display area being configured to display an image toward an inside of the vehicle, the external display area being configured to display an image toward an outside of the vehicle.

The electrochromic film may include an SPD (Suspended Particle Devices) film attached on the inner surface of the windshield, and a PDLC (Polymer Dispersed Liquid Crystal) film attached to the inner surface of the SPD film.

The internal display area may be located at a higher level from the ground than the external display area.

Each of the internal and the external display areas may have a separate power application path.

The projector may be a short focal length projector configured to project an image toward the internal and external display areas.

The projector may be disposed around a floor of the vehicle to secure an FOV (Field Of View) area, and may have a projection light path between the internal and external display areas.

The projector may be disposed in a cockpit of the vehicle to secure a field of view, and may have a projection light path between the internal and external display areas.

The projector may be disposed on an inner surface of a roof of the vehicle to secure a field of view, and may have a projection light path between the internal and external display areas.

A reflecting mirror may be configured to adjust a position of an image projected onto the internal and external display areas and may be disposed on the projection light path.

According to another aspect, there is provided a smart mobility vehicle including a windshield having adjustable transparency based on power applied thereto, and comprising an internal display area and an external display area, and a projector configured to project vehicle driving information onto the windshield, wherein a projection light path of the projector is adjusted between the internal and external display areas through position adjustment for each of the internal display area and the external display area.

An empty space that may not interfere with a peripheral object is formed around the projection light path.

The projector may be configured to selectively adjust a projection area such that an image displayed on the external display area may not be seen by a passenger.

According to another aspect, there is provided a smart mobility vehicle including a console disposed in a dashboard of a vehicle, a cockpit module disposed at the top of the console, the cockpit module being configured to be movable upward and downward, and a steering wheel connected to the rear of the cockpit module, the steering wheel being configured to be movable from side to side in a longitudinal direction of the cockpit module.

The console may include a housing forming a body, and may have a guide hole formed to extend in a top-to-bottom direction, a slider configured to slide upward and downward on the guide hole of the housing, an elastic member disposed at the bottom of the slider, a locking member configured to limit movement of the slider, and a lever connected to a rear of the slider, wherein the lever may be interlocked with the slider and the locking member through a reciprocal link structure, and may be configured to unlock the slider locked by the locking member, in response to the lever being pulled to the rear of the slider.

A guide bracket may be configured to guide the upward and downward movement of the slider, and a holder may be disposed at the bottom of the guide bracket, wherein the slider may be movably connected to the top of the guide bracket, and the elastic member may be fixed to the bottom of the guide bracket.

The guide bracket may have an L-shaped cross-sectional structure.

The holder may have an upper portion which is inclined downward toward the front of the vehicle.

The locking member may be configured to be moved to the outside in a lateral direction by a compression spring located on the inside in the lateral direction, and to unlock the slider, in response to the lever being pulled to the rear.

The lever may be disposed to not interfere with a side to side movement of the steering wheel.

The housing may be bent in an inclined manner upward toward the front, and is configured to guide the upward and downward movement of the cockpit module.

Other features and aspects will be apparent from the following detailed description, the drawings, and the claims.

Figure 1:
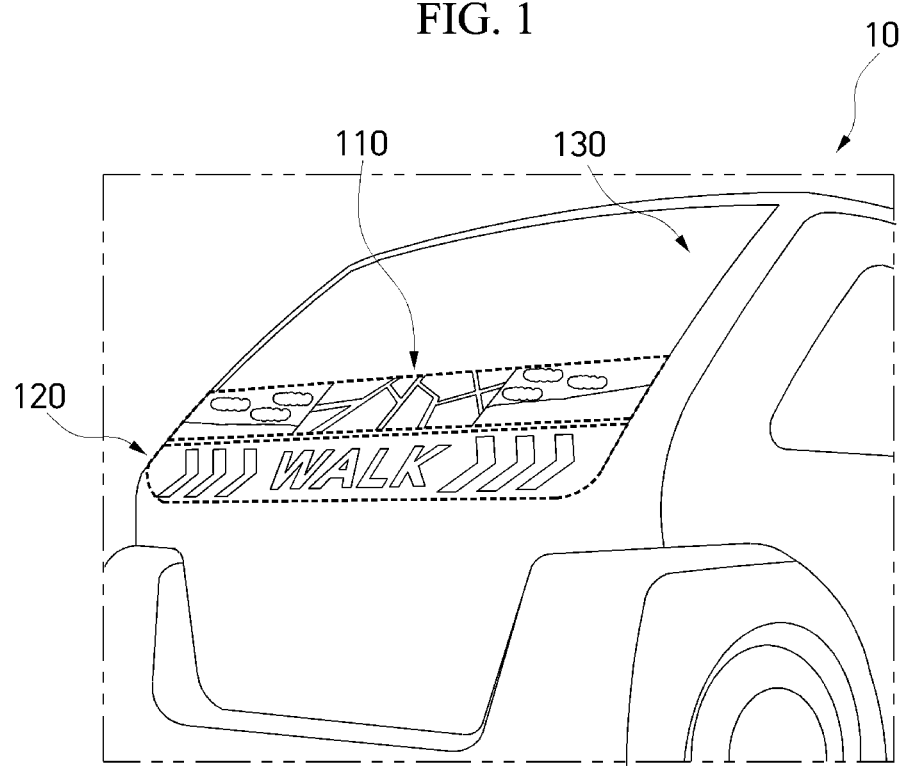
FIG. 1 is a diagram illustrating a smart mobility vehicle in accordance with an embodiment of the present disclosure.
Figure 2:
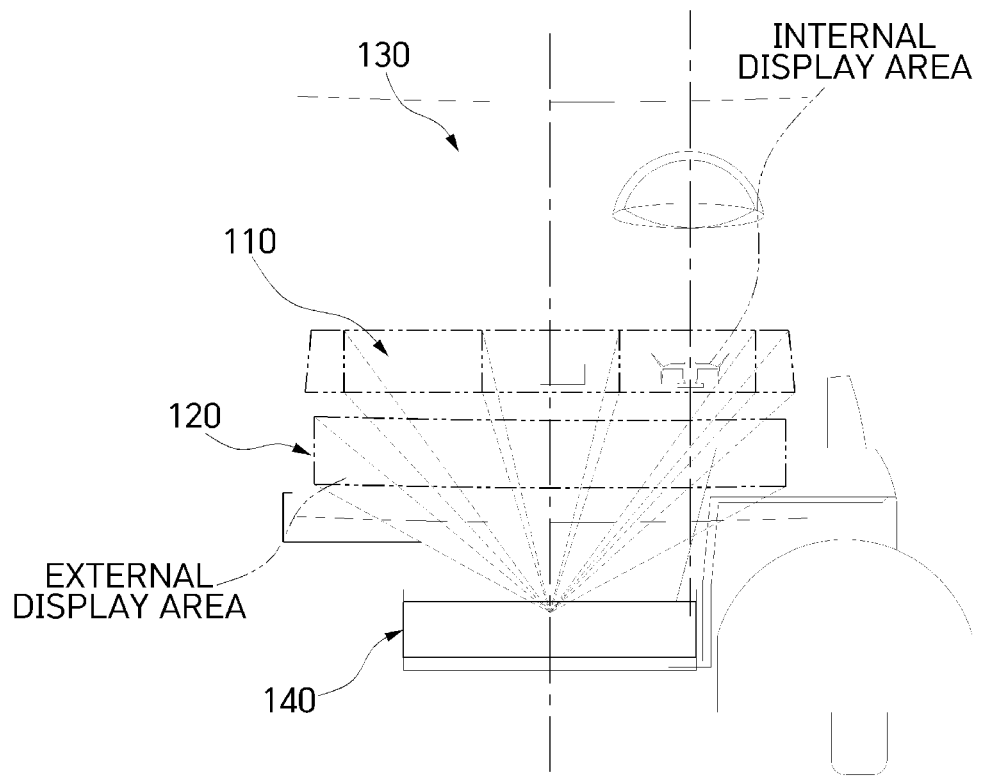
FIG. 2 is a front view schematically illustrating an internal system in a projection device of the smart mobility vehicle in accordance with the embodiment of the present disclosure.
Figure 3:
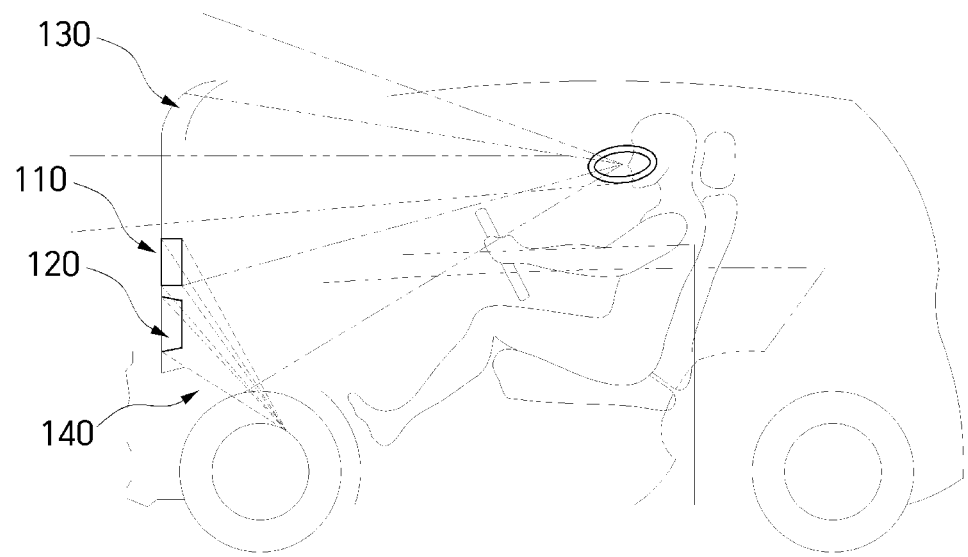
FIG. 3 is a side view schematically illustrating the internal system in the projection device of the smart mobility vehicle in accordance with the embodiment of the present disclosure.
Figure 4:
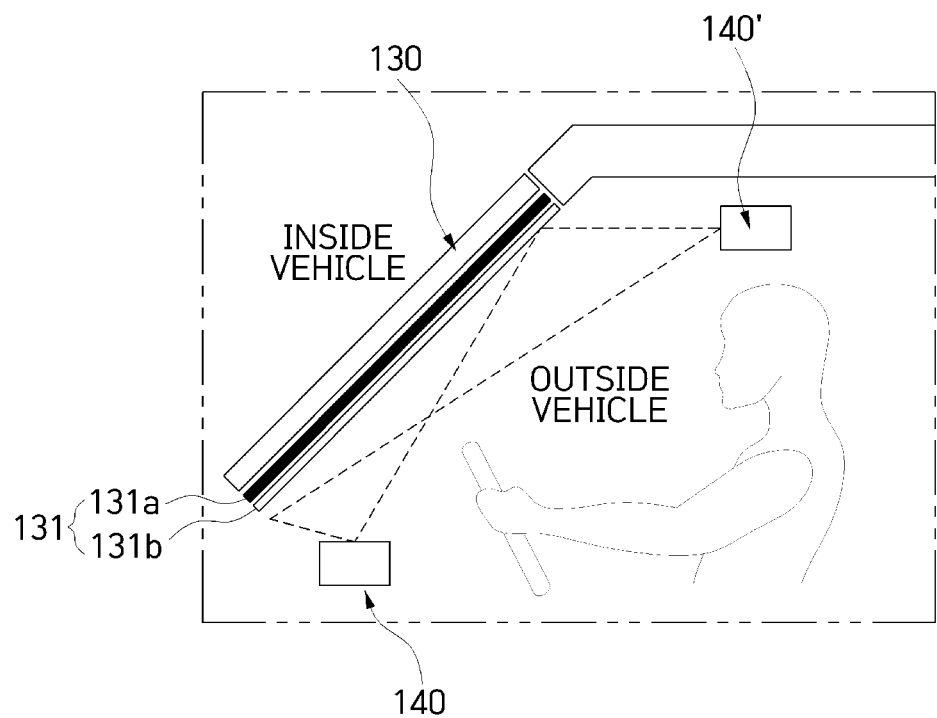
FIG. 4 is a diagram schematically illustrating a projection light path of a projector in the projection device of the smart mobility vehicle in accordance with the embodiment of the present disclosure.
Figure 5:
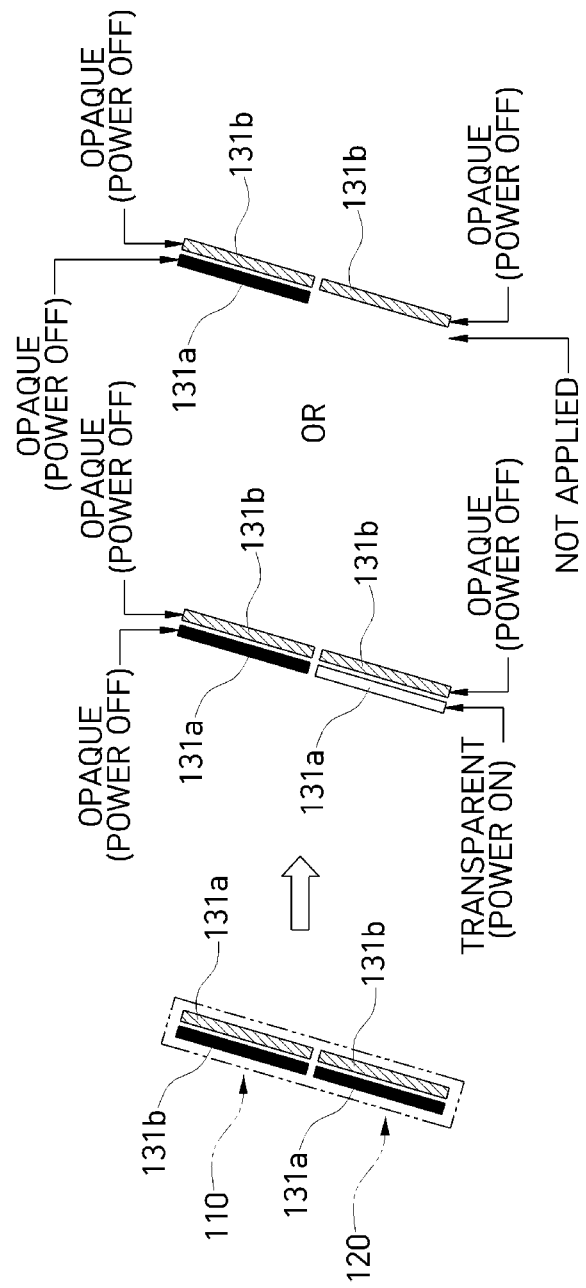
FIG. 5 is a diagram illustrating the configurations of internal and external displays in the projection device of the smart mobility vehicle in accordance with the embodiment of the present disclosure.
Figure 6:
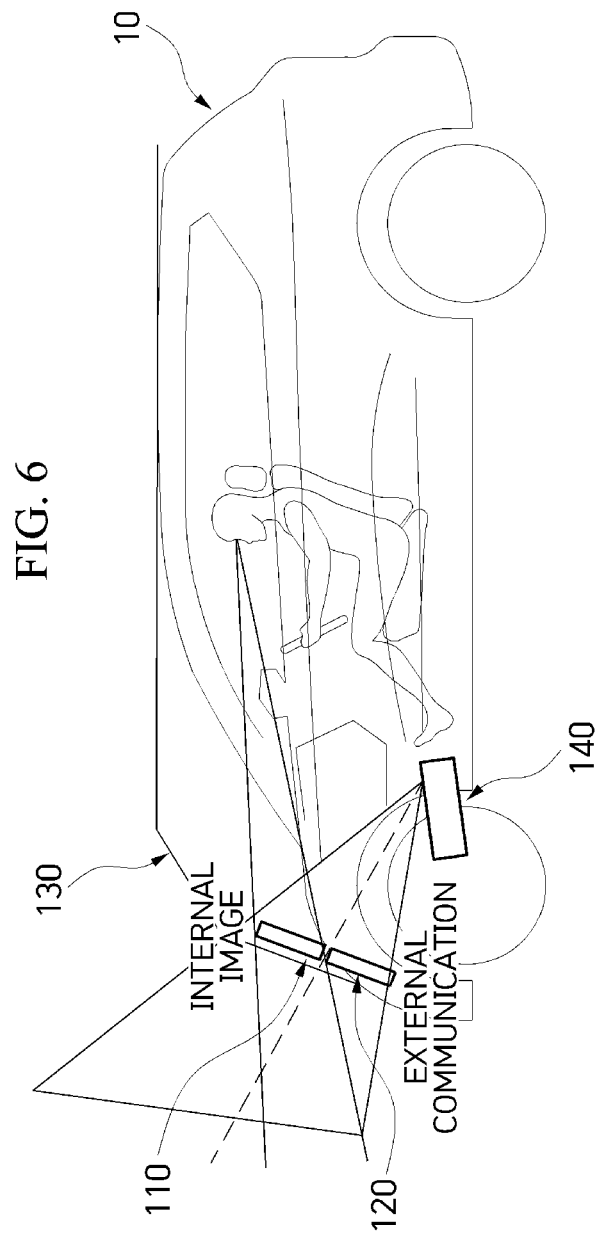
FIGS. 6 to 9 are diagrams illustrating modified examples in which the projector is mounted in the vehicle, in the projection device of the smart mobility vehicle in accordance with the embodiment of the present disclosure.
Figure 7:
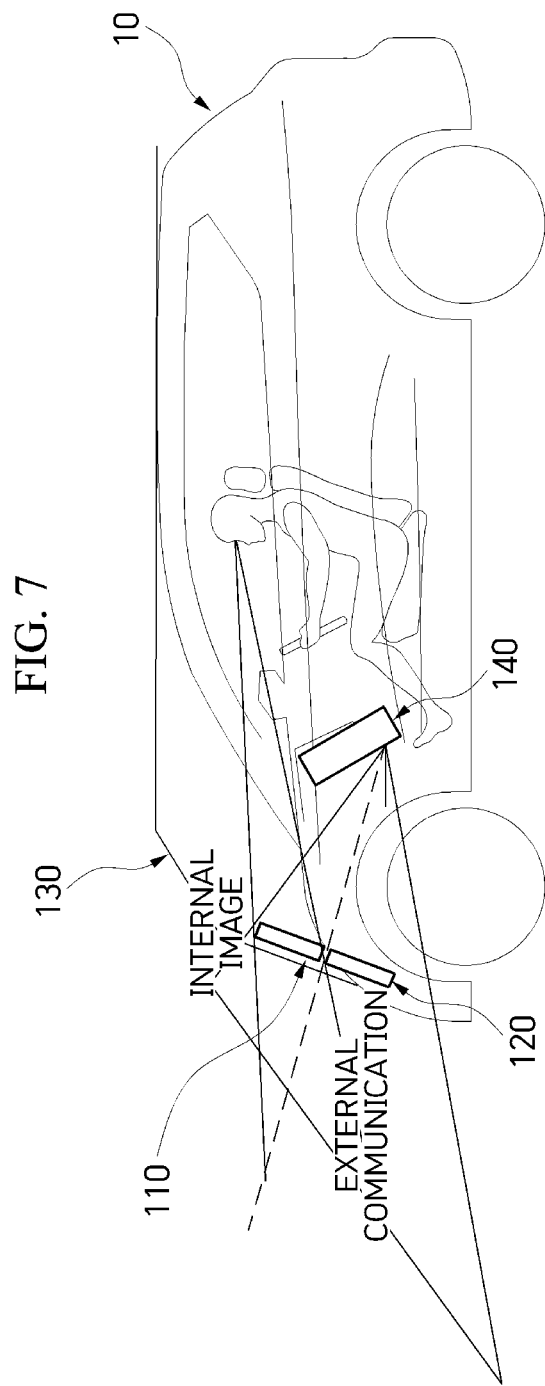
Figure 8:
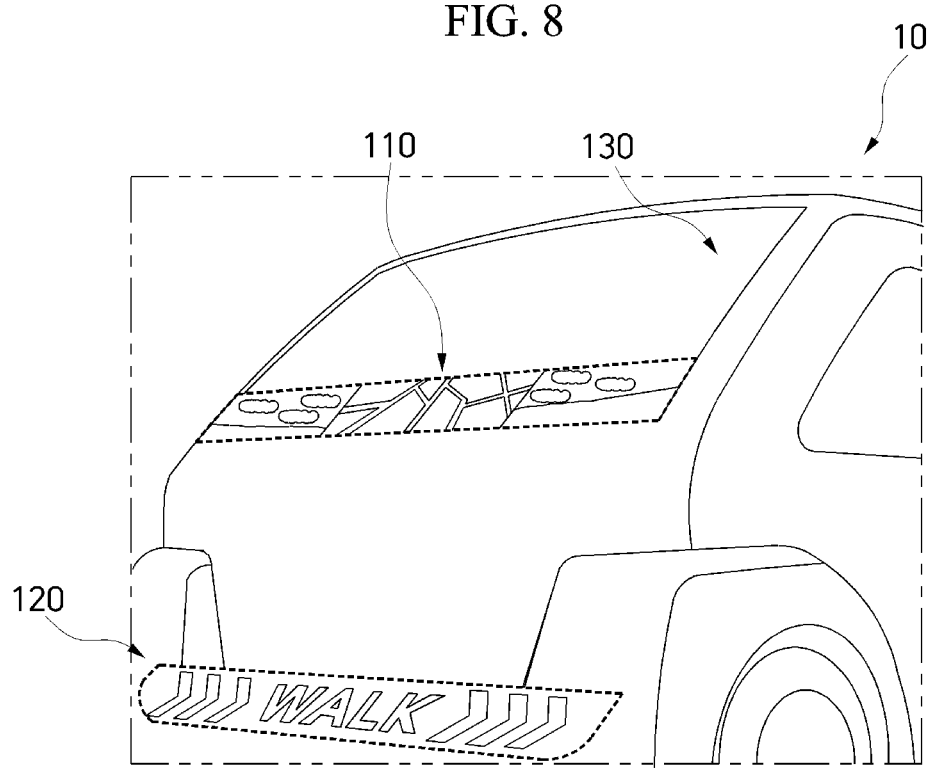
Figure 9:
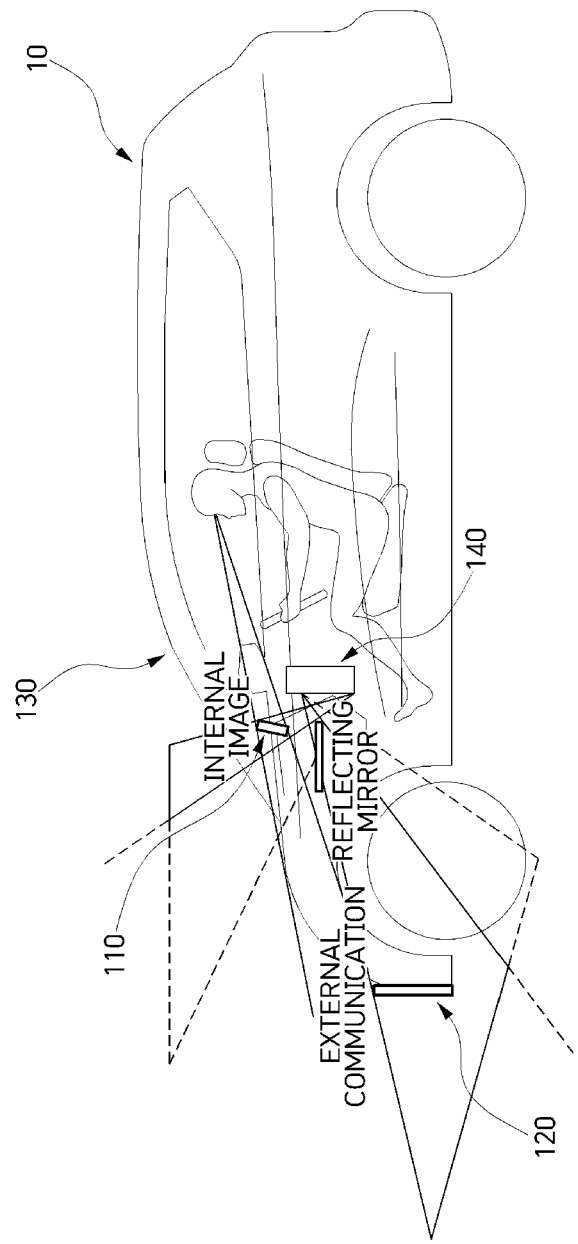
Figure 10:
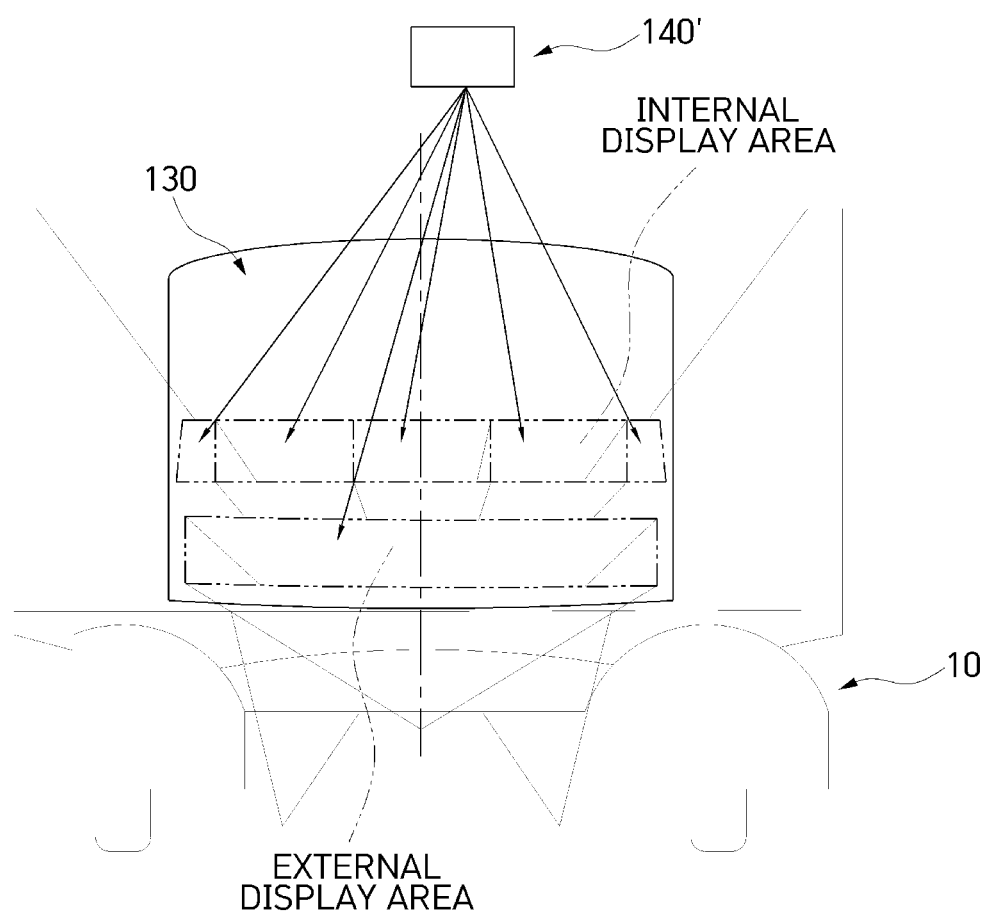
FIG. 10 is a diagram illustrating that a display screen is divided for each function through one projector in the projection device of the smart mobility vehicle in accordance with the embodiment of the present disclosure.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Hereinafter, example embodiments will be described in detail with reference to the accompanying drawings. When describing the example embodiments with reference to the accompanying drawings, like reference numerals refer to like components and a repeated description related thereto will be omitted.

Hereafter, a projection device, a cockpit moving structure, a steering device, and an occupant recognition-based image display control device and method of a smart mobility device in accordance with an embodiment of the present disclosure will be described. Embodiments in accordance with the devices and structures may be carried out on the basis of the smart mobility vehicle.

Hereafter, exemplary embodiments of the present disclosure will be described in detail with reference to the accompanying drawings.

Projection Device of Smart Mobility Vehicle
(FIGS. 1 to 10)

FIGS. 1 to 10 illustrate a projection device of a smart mobility vehicle in accordance with an embodiment of the present disclosure.

Referring to FIGS. 1 to 10, the projection device of the smart mobility vehicle basically includes a windshield 130 and a projector 140.

The windshield 130 may include an internal display area and an external display area, which are divided and applied. The internal display area displays an image toward the inside of a vehicle 10, and the external display area displays an image toward the outside of the vehicle 10.

The internal display area may be located at a higher level than the external display area, and has an internal display 110 located therein.

The external display area may be located at a lower level than the internal display area, and located in an air vent area (not illustrated) located at the front of an existing bumper (not illustrated). Such an external display area has an external display 120 located thereon.

The internal and external displays 110 and 120 each have a separate power application path.

The projector 140 projects an image for each function, containing vehicle driving information, toward the windshield 130.

The projector 140 is configured as a short focal length projector which projects images toward the internal and external display areas.

The projector 140 is disposed around the floor of the vehicle, where an FOV (Field Of View) area can be secured, and has a projection light path between the internal and external display areas.

For another example, the projector 140 may be disposed in a cockpit of the vehicle, where an FOV area can be secured, and have a projection light path between the internal and external display areas. For still another example, a projector 140' may be disposed on the inner surface of the roof of the vehicle, where the field of view can be secured, and have a projection light path between the internal and external display areas.

At this time, a reflecting mirror capable of adjusting the position of an image projected onto the internal/external display area may be disposed on the projection light path.

The projector 140 may have a projection light path between the internal and external display areas by adjusting the position of each front projection area.

Here, an empty space which does not interfere with a peripheral object may be formed around the projection light path.

The projector 140 may selectively adjust the projection area, such that an image displayed on the external display area is not seen by an occupant.

In other words, in order to promote the convenience and stability of the occupant's driving, an image of the external display 120 except an image of the internal display 110, which is required for the occupant, may be blocked inside the vehicle.

The projection device of the smart mobility vehicle in accordance with another embodiment of the present disclosure includes an internal display 110, an external display 120 and a projector 140.

The internal display 110 displays an image toward a driver seat.

The external display 120 displays an image toward the outside of a vehicle 10.

The projector 140 emits beam toward the internal and external displays 110 and 120 such that an image for each function, containing vehicle driving information, is displayed on the internal and external displays 110 and 120.

The projector 140 may divide a screen for each function by projecting the image for each function, containing the vehicle driving information, onto the internal and external displays 110 and 120 at the same time.

The internal and external displays 110 and 120 may each have an electrochromic film 131 whose transparency can be adjusted when power is applied thereto.

The electrochromic film 131 includes a first film 131a attached to the inner surface of a windshield and a second film 131b attached to the inner surface of the first film 131a.

At this time, the first film 131a may be an SPD (Suspended Particle Devices) film having a dark color, and the second film 131b may be a PDLC (Polymer Dispersed Liquid Crystal) film having a relatively brighter color than the first film 131a.

The first film 131a may be switched to a black color when the power supply is turned off, and switched to a transparent color when the power supply is turned on. At this time, the transparent color may differ depending on the tinting concentration of the vehicle.

The second film 131b may be switched to an opaque white color when the power supply is turned off, and switched to a transparent color when the power supply is turned on.

Since information is acquired from an image formed on the surface of the internal display 110, external light needs to be blocked in order to secure visibility. On the other hand, since an image formed on the surface of the external display 120 needs to be checked from the outside, the external area of the external display 120 needs to be exposed.

When the color of the windshield 130 is changed by electricity applied thereto, the voltage/current of the applied electricity may be adjusted to gradually apply the change between the transparent state and the opaque state, in order to improve the emotional quality. In this case, the effect for a UI (User Interface) may be implemented. Furthermore, when the state of the windshield 130 needs to be switched in different situations, the state of the windshield 130 can be switched immediately.

Cockpit Moving Structure of Smart Mobility Vehicle (FIGS. 11 to 20)

Figure 11:
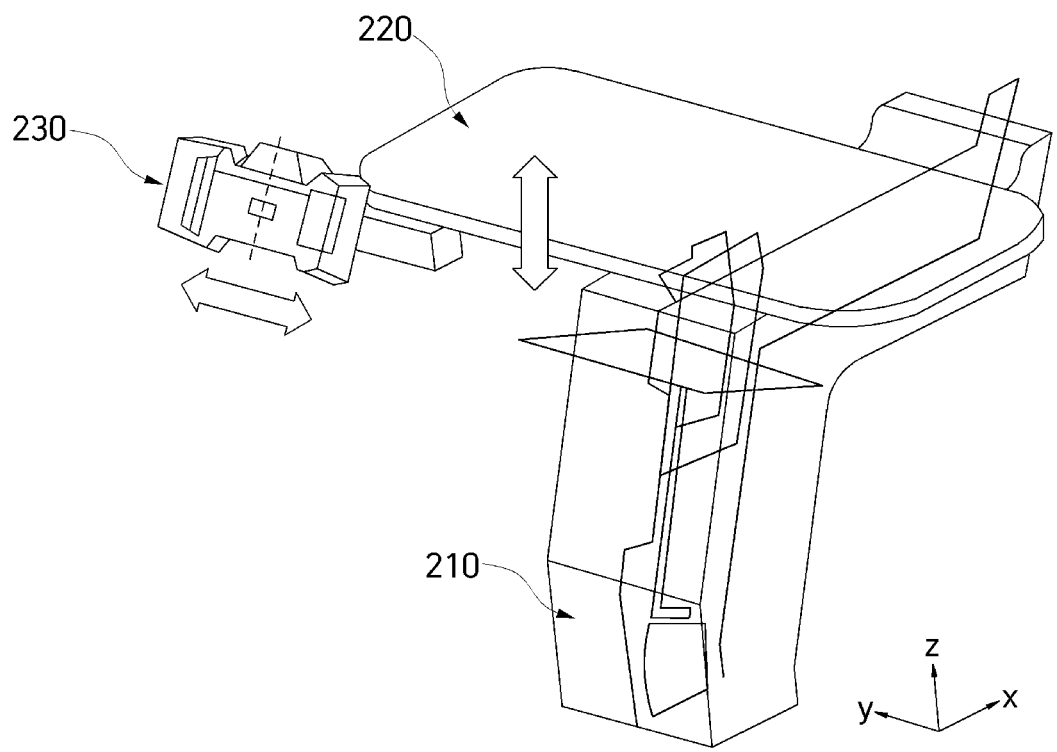
FIG. 11 is a diagram schematically illustrating a cockpit moving structure of the smart mobility vehicle in accordance with the embodiment of the present disclosure.

FIG. 11 schematically illustrates a cockpit moving structure of the smart mobility vehicle in accordance with the embodiment of the present disclosure.

Referring to FIG. 11, the cockpit moving structure is a component of a next-generation smart mobility vehicle, in which a driver seat is configured as a bench seat and the positions of components within the cockpit can be switched.

Such a cockpit moving structure includes a console 210, a cockpit module 220 and a steering wheel 230.

The console 210 is disposed in a dashboard area at the inner front of the vehicle.

The cockpit module 220 is disposed at the top of the console 210, and can be moved in a top-to-bottom direction.

The steering wheel 230 is connected to the rear of the cockpit module 220, and can be moved from side to side in the longitudinal direction of the cockpit module 220. The longitudinal direction of the cockpit module 220 indicates a side-to-side length.

Figure 12:
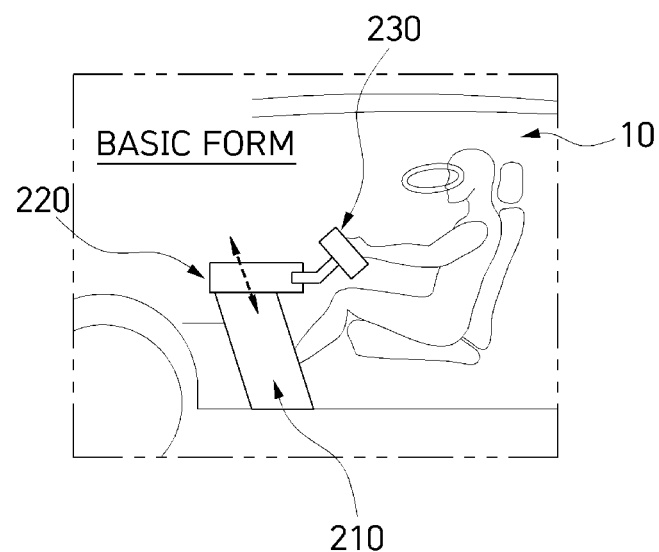
FIGS. 12 to 14 are diagrams illustrating an example in which a cockpit module and a steering wheel are moved, in the cockpit moving structure of the smart mobility vehicle in accordance with the embodiment of the present disclosure.
Figure 13:
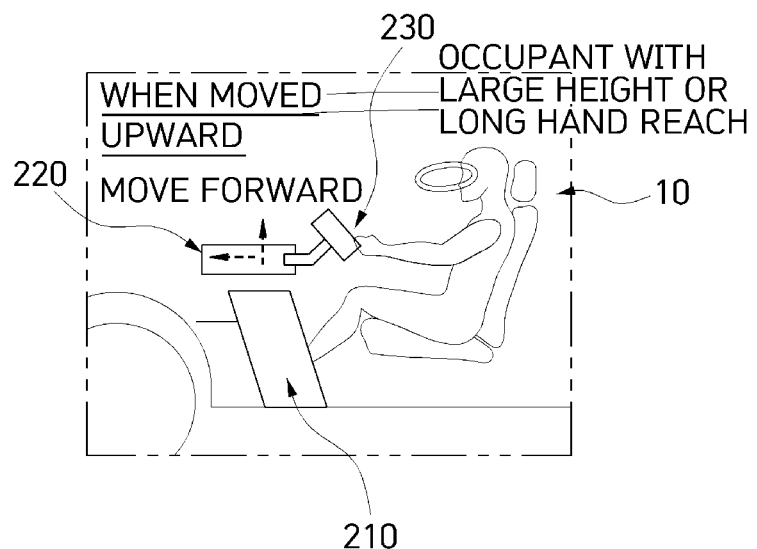
Figure 14:
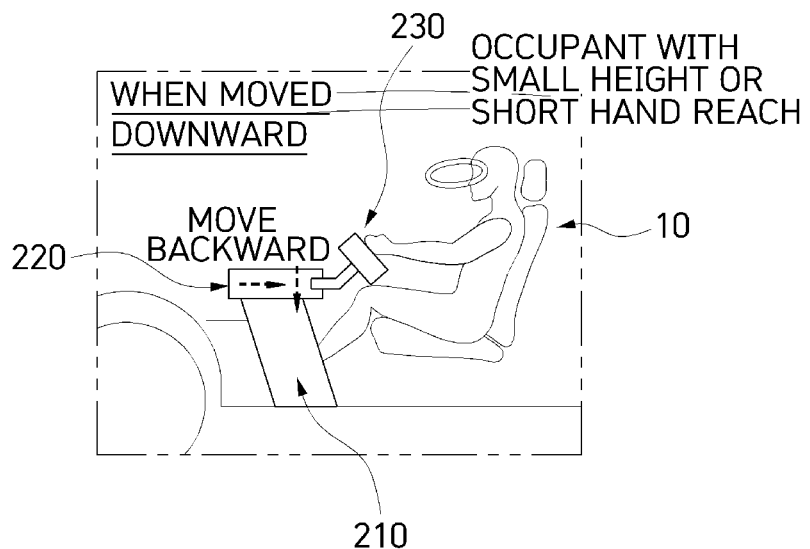

FIGS. 12 to 14 illustrate an example in which the cockpit module and the steering wheel are moved, in the cockpit moving structure of the smart mobility vehicle in accordance with the embodiment of the present disclosure.

Referring to FIGS. 12 to 14, the cockpit moving structure of the smart mobility vehicle 10 in accordance with the embodiment of the present disclosure has a configuration in which the cockpit module 220 connected to the console 210 can be moved in the top-to-bottom direction according to the body type of an occupant as illustrated in FIG. 12.

At this time, the console 210 is tilted at a predetermined angle toward an engine room (not illustrated).

When the cockpit module 220 is moved upward, a seating posture space for the occupant and an available space for the occupant's hand reach may be increased through a tilt-up and tele-in operation of moving the cockpit module 220 to the front (toward the engine room) and rotating the cockpit module 220 upward.

When the cockpit module 220 is moved downward, the seating posture space for the occupant and the available space for the occupant's hand reach may be decreased through a tilt-down and tele-out operation of moving the cockpit module 220 to the rear (toward the occupant) and rotating the cockpit module 220 downward.

FIGS. 13 and 14 illustrate that the position of the cockpit module 220 is moved upward when the cockpit module 220 faces forward, and moved downward when the cockpit module 220 faces backward. However, this is only an example for description, and the present disclosure is not limited to such a structural mechanism. The position of the cockpit module 220 may be adjusted while the cockpit module 220 is unlocked from the console 210.

Figure 15:
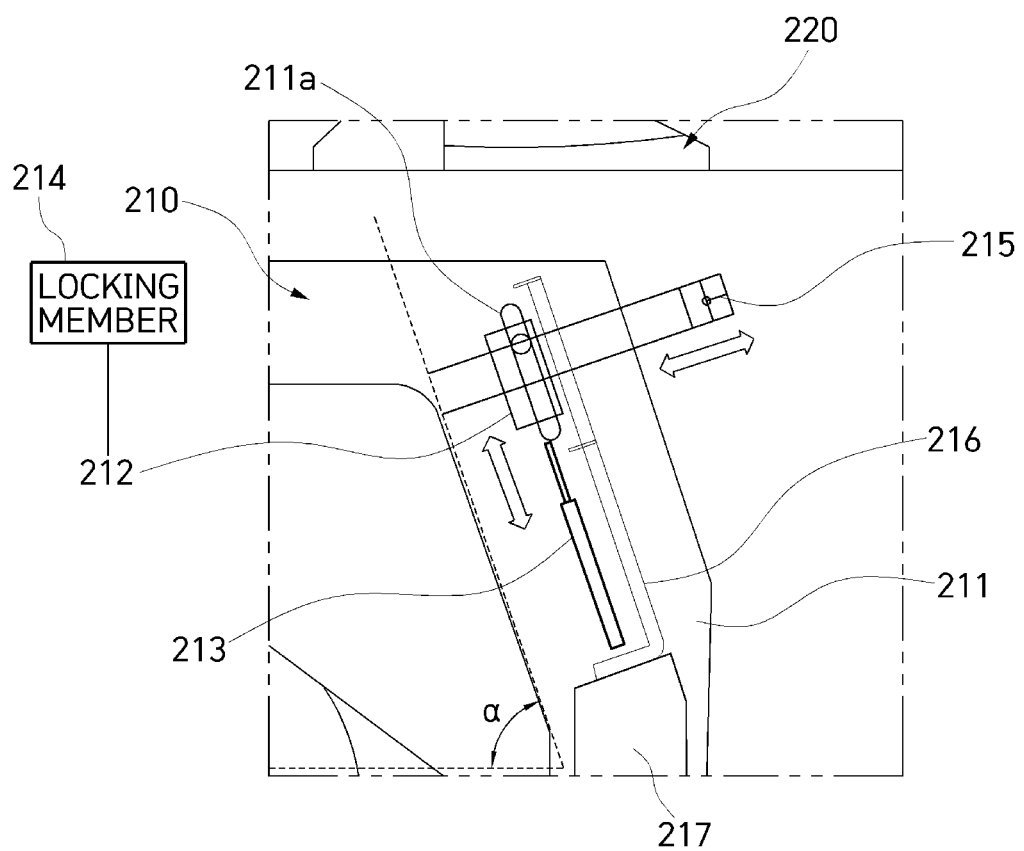
FIGS. 15 to 17 are diagrams schematically illustrating the cockpit moving structure of the smart mobility vehicle in accordance with the embodiment of the present disclosure.
Figure 16:
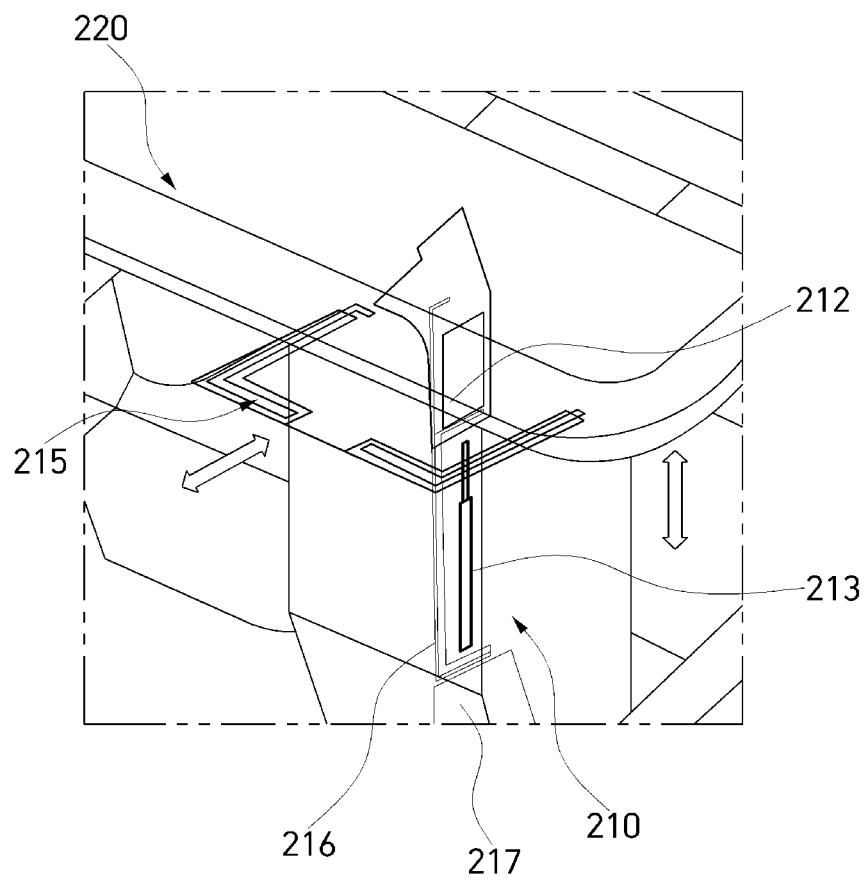
Figure 17:
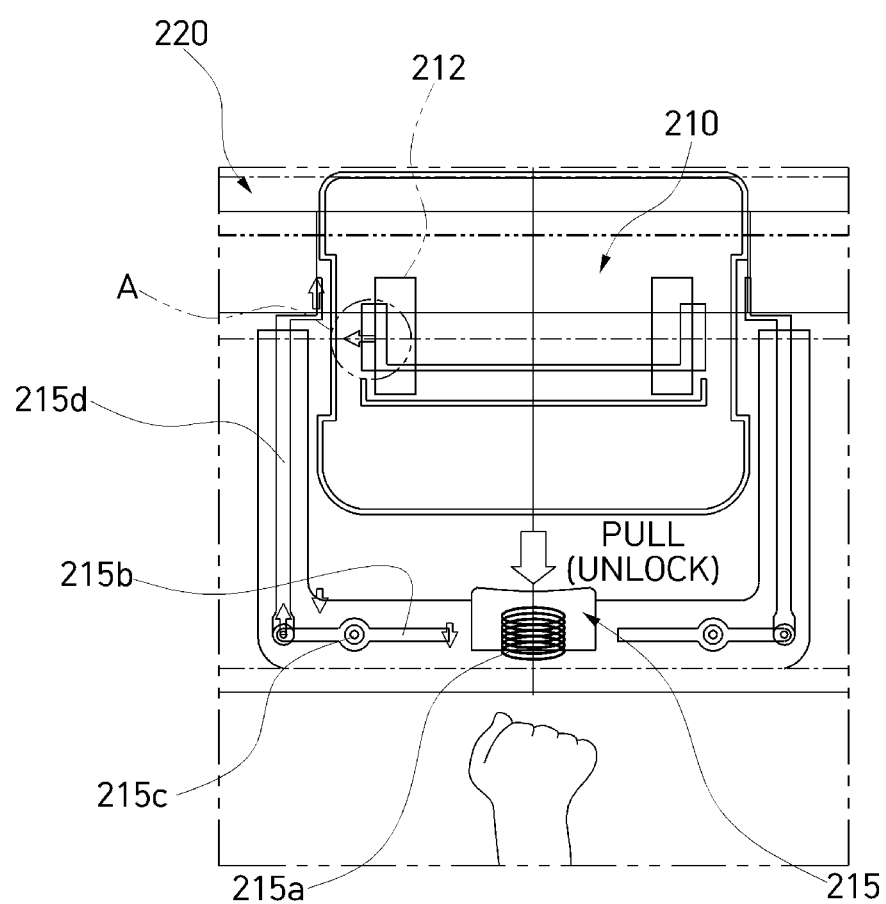
Figure 18A:
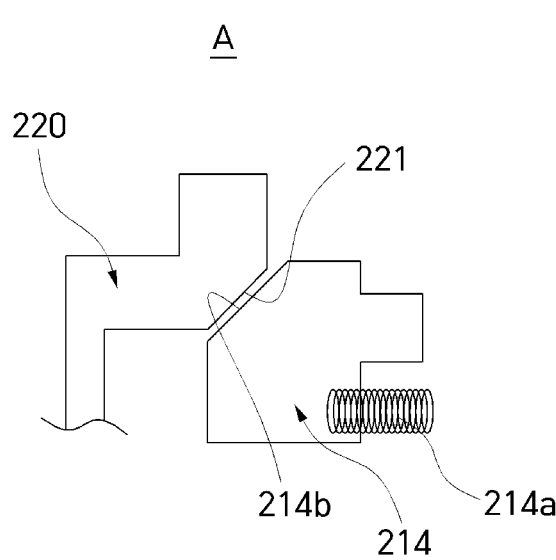
FIG. 18A-18B are diagrams illustrating an example in which a portion A illustrated in FIG. 17 is unlocked.
Figure 18B:
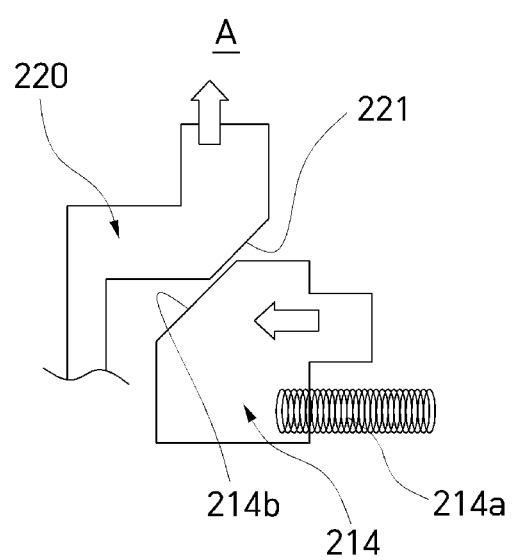

FIGS. 15 to 17 schematically illustrate the cockpit moving structure of the smart mobility vehicle in accordance with the embodiment of the present disclosure, and FIG. 18 illustrates an example in which a portion A marked in FIG. 17 is unlocked.

Referring to FIGS. 15 to 18, the console 210 includes a housing 211, a slider 212, an elastic member 213, a locking member 214, a lever 215, a guide bracket 216 and a holder 217.

The housing 211 forms the body of the console 210, and has a guide hole 211a disposed at the inner top thereof and formed as a long hole in the top-to-bottom direction. Such a housing 211 is formed with a bending structure which is inclined upward toward the front, and has a structural characteristic to guide the upward/downward movement of the cockpit module 220.

The slider 212 may be slid upward and downward in the guide hole 211a of the housing 211. Such a slider 212 is structurally connected to the cockpit module 220.

The elastic member 213 is disposed at the bottom of the slider 212. When the slider 212 is unlocked, the elastic member 213 serves to compensate for the weight of the cockpit module 220 in order to prevent the cockpit module 220 from drooping due to the weight thereof. Such an elastic member 213 may be any one of an air spring, a torsion spring, a compression spring and a tension spring.

The locking member 214 limits the movement of the slider 212 by locking and unlocking the slider 212. When the lever 215 is pulled backward, the locking member 214 may be moved to the outside in a lateral direction by a compression spring 214a located on the inside in the lateral direction, and may unlock the slider 212.

The lever 215 has a hand grip structure, and is connected to the rear of the slider 212. Such a lever 215 is interlocked with the slider 212 and the locking member 214 through a reciprocal link structure. For example, when the lever 215 is pulled to the rear of the slider 212, the lever 215 may unlock the slider 212 locked by the locking member 214.

The lever 215 may be disposed at a position where the lever 215 does not interfere with the steering wheel (230 of FIG. 14), when the steering wheel 230 is moved from side to side.

The guide bracket 216 guides the slider 212 to slide upward/downward. The slider 212 is movably connected to the top of the guide bracket 216, and the elastic member 213 is fixed to the bottom of the guide bracket 216. Such a guide bracket 216 may have an L-shaped cross-sectional structure.

The holder 217 is disposed at the bottom of the guide bracket 216, and serves as a support of the guide bracket 216. Such a holder 217 may have an upper portion which is inclined downward toward the front.

As illustrated in FIGS. 17 and 18, a lifting and lowering mechanism of the cockpit module 220 which is lifted and lowered by the operation of the lever 215 is operated as follows.

When an occupant pulls the lever 215 to the rear (toward the occupant), one side of a first lever 215b interlocked with the lever 215 is rotated about a rotating shaft 215c such that the position thereof is switched to the rear with the lever 215, and the other side of the first lever 215b is rotated about the rotating shaft 215c such that the position thereof is switched to the front.

One side of a second lever 215d is interlocked with the other side of the first lever 215b, and moved forward. At this time, a section of the second lever 215d on the other side thereof maintains the state in which the locking member 214 locks the slider 212. Then, when the one side of the second lever 215d is moved forward, the section of the second lever 215d on the other side thereof is moved forward in connection with the forward movement of the one side of the second lever 215d. Through this process, the locking member 214 is moved to the outside in the lateral direction by the compression spring 214a located on the inside in the lateral direction, and unlocks the slider 212.

When the occupant pushes the lever 215 forward while the slider 212 is unlocked, the position of the cockpit module 220 is moved upward toward the front. On the other hand, when the occupant pulls the lever 215 backward, the position of the cockpit module 220 is moved downward toward the rear.

At this time, when the lever 215 enters a preset section at the rear, the locking member 214 of the cockpit moving structure can lock the slider 212 again.

Figure 19:
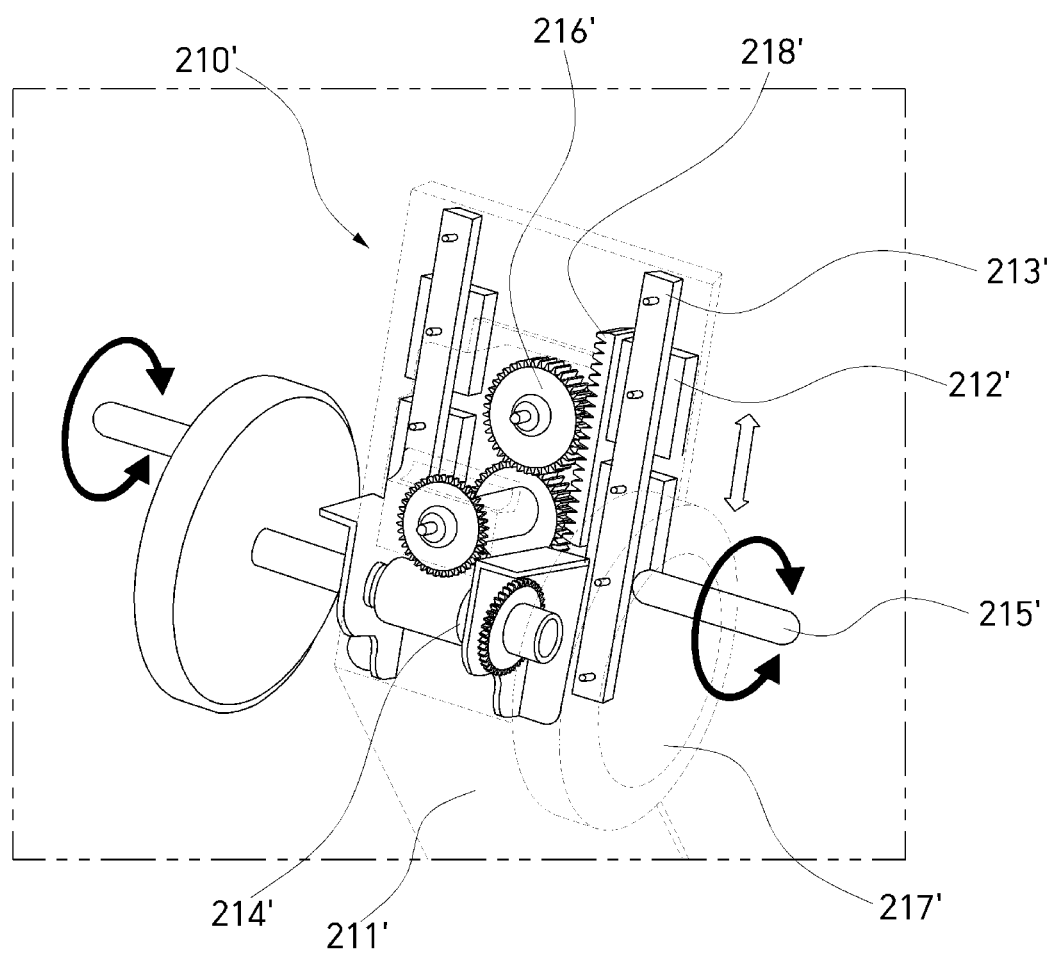
FIGS. 19 to 20 are diagrams illustrating an example in which the cockpit module is moved in a top-to-bottom direction through a rotation operation in the cockpit moving structure of the smart mobility vehicle in accordance with the embodiment of the present disclosure.
Figure 20:
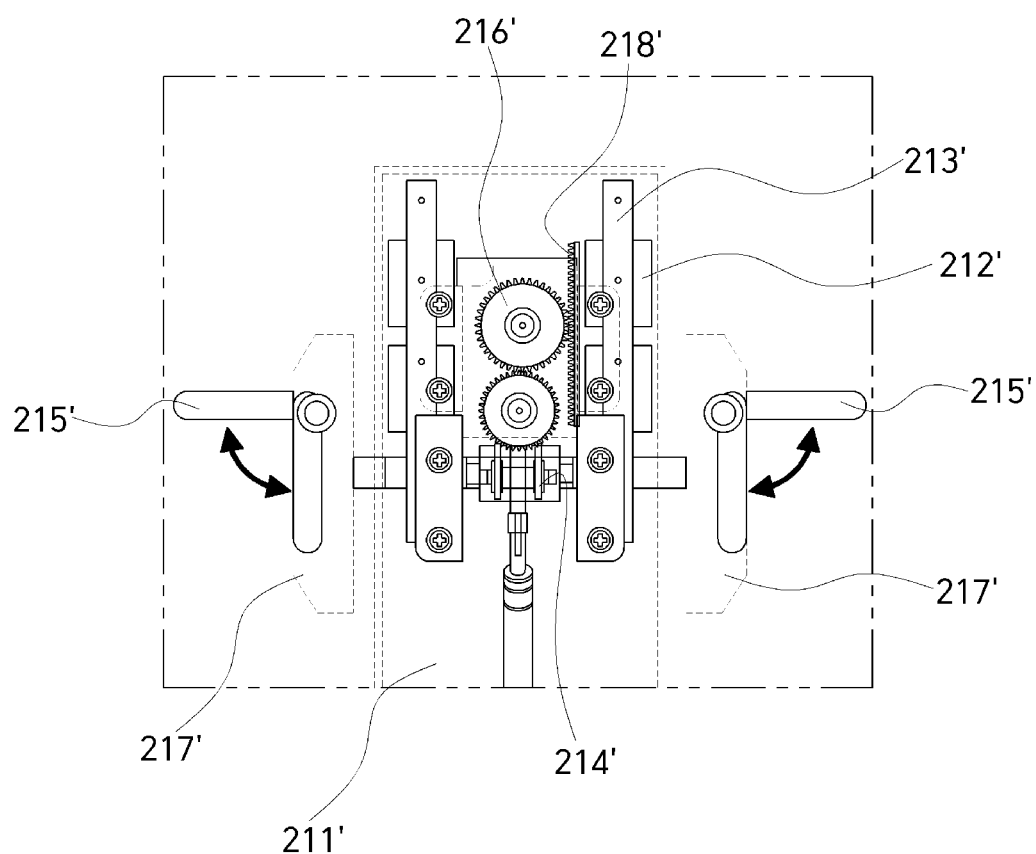

FIGS. 19 to 20 illustrate an example in which the cockpit module is moved in the top-to-bottom direction through a rotation operation, in the cockpit moving structure of the smart mobility vehicle in accordance with the embodiment of the present disclosure.

According to the cockpit moving structure of the smart mobility vehicle, illustrated in FIGS. 19 and 20, an occupant may move the cockpit module (220 of FIG. 11) upward and downward through a manual rotation method, unlike the embodiment described with reference to FIGS. 15 to 18.

A console 210' includes a lever 215' which is disposed on either side at the top thereof, and rotated in the front-to-rear direction so as to lift/lower the cockpit module (220 in FIG. 11).

The console 210' may additionally include a housing 211', a slider 212', a rail 213', a worm gear 214', a spur gear 216', a circular holder 217' and a rack gear 218'.

The housing 211' is a basic frame having a housing space therein.

The rail 213' is disposed at the inner top of the housing 211' along the top-to-bottom length thereof. At this time, the rail 213' may guide the lifting/lowering path of the slider 212', and the slider 212' may be lifted/lowered on the path of the rail 213'.

The worm gear 214' can be rotated in connection with the lever 215'. Such a worm gear 214' may be set to a self locking mode for preventing reverse rotation thereof.

The spur gear 216' is located at the top of the worm gear 214', and rotated in connection with the worm gear 214'.

The circular holder 217' may have a structure capable of seating the lever 215' thereon, and the lever 215' may be hidden through a rotating or sliding operation thereof.

The rack gear 218' may be disposed on a side surface of the spur gear 216', such that the position thereof can be adjusted in the top-to-bottom direction by the rotation of the spur gear 216'.

Steering Device of Smart Mobility Vehicle (FIGS. 21 to 30)

Figure 21:
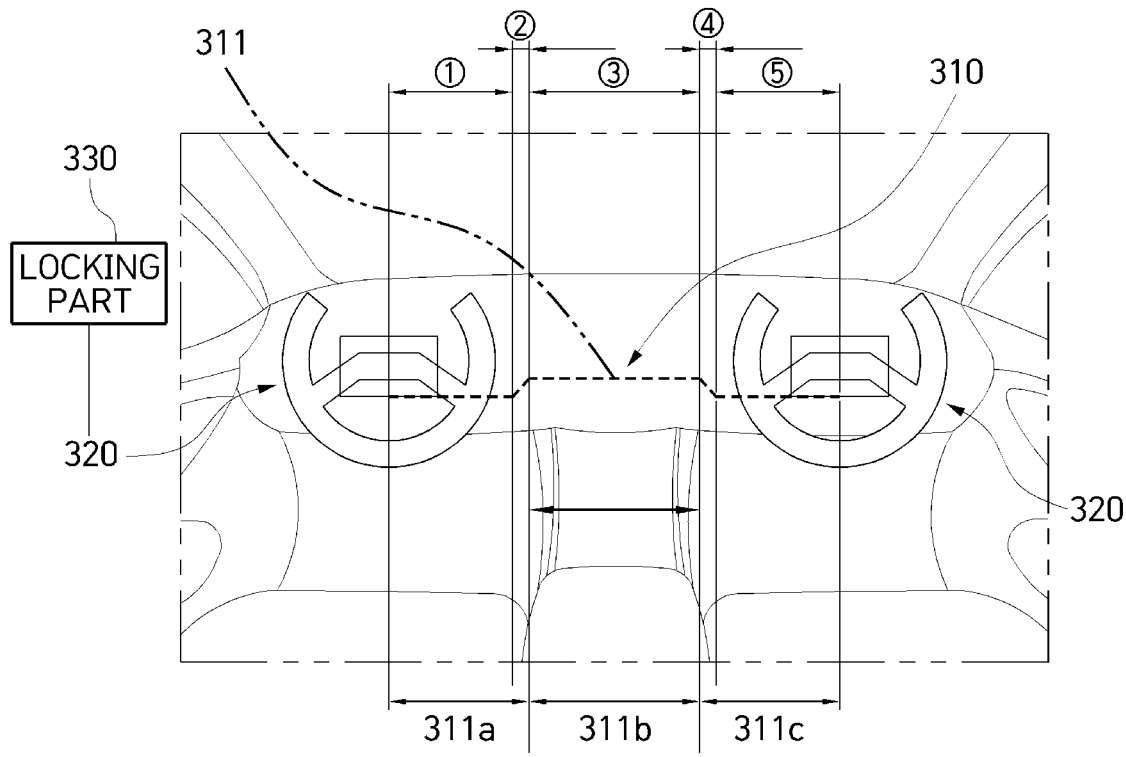
FIGS. 21 and 22 are diagrams schematically illustrating a steering wheel part, whose position can be switched between a driver seat and a passenger seat, in a steering device of the smart mobility vehicle in accordance with the embodiment of the present disclosure.
Figure 22:
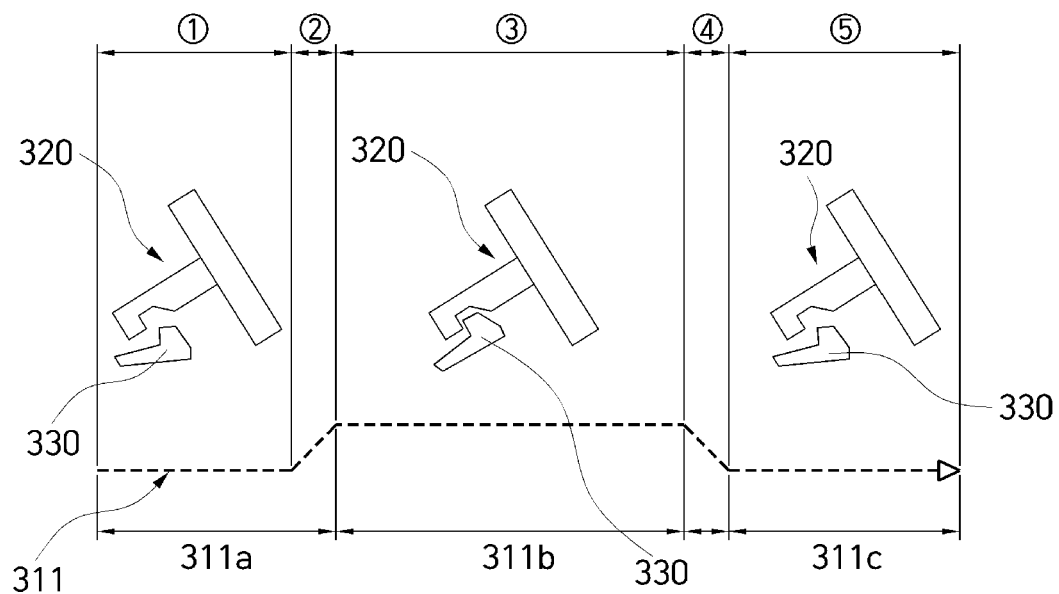

FIGS. 21 and 22 schematically illustrate a steering wheel part whose position can be switched between a driver seat and a passenger seat, in a steering device of the smart mobility vehicle in accordance with the embodiment of the present disclosure.

Referring to FIGS. 21 and 22, the steering device of the smart mobility vehicle includes a cockpit module 310, a steering wheel part 320 and a locking part 330.

The cockpit module 310 is located in front of the driver seat and the passenger seat within the vehicle. Such a cockpit module 310 includes a rail bracket 311 including a first flat section 311a (①), a second flat section 311c (⑤), and a locking section 311b (②, ③ and ④). The first and second flat sections 311a and 311c are located in front of the driver seat and the passenger seat, respectively, and the locking section 311b is curved upward and serves to connect the first and second flat sections 311a and 311c.

The locking section 311b has first and second inclined sections ② and ④ formed at both ends thereof, and the first and second inclined sections ② and ④ are engaged with the steering wheel part 320 so as to restrict the rotation of the steering wheel part 320.

The steering wheel part 320 is connected to the cockpit module 310, such that the position thereof can be switched toward the driver seat or the passenger seat in the longitudinal direction of the cockpit module 310.

When the steering wheel part 320 passes through the locking section 311b (②, ③, and ④) as the position thereof is switched by a user's manipulation, the rotation of the steering wheel part 320 needs to be restricted. This is in order to improve the driving safety of the vehicle.

The locking part 330 fixes the steering wheel part 320 according to a preset condition. The preset condition indicates optimal reference data considering the stopping and parking states of the smart mobility vehicle, information on whether the driving road corresponds to a straight section, and the driving safety.

Here, driving road determination logic monitors the road condition ahead through a radar or lidar, and determines that the steering wheel part 320 can be switched from side to side, when the corresponding road is a straight section. At this time, the steering wheel part 320 may be automatically and/or manually unlocked through the locking part 330.

Figure 23:
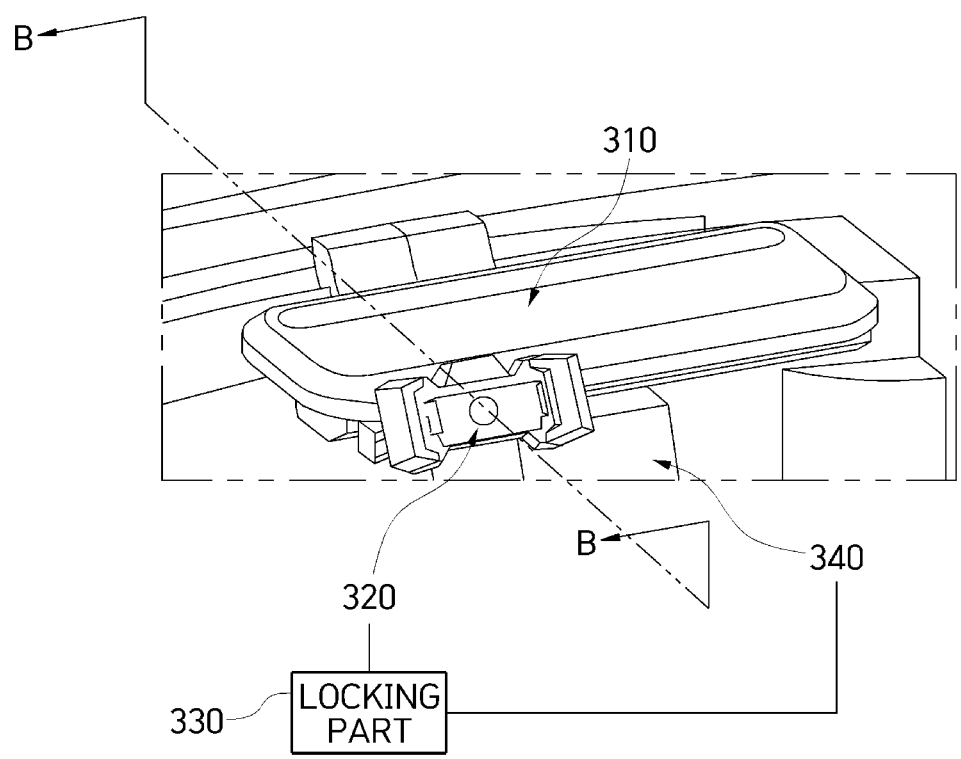
FIG. 23 is a diagram schematically illustrating the steering device in the smart mobility vehicle in accordance with the embodiment of the present disclosure.
Figure 24:
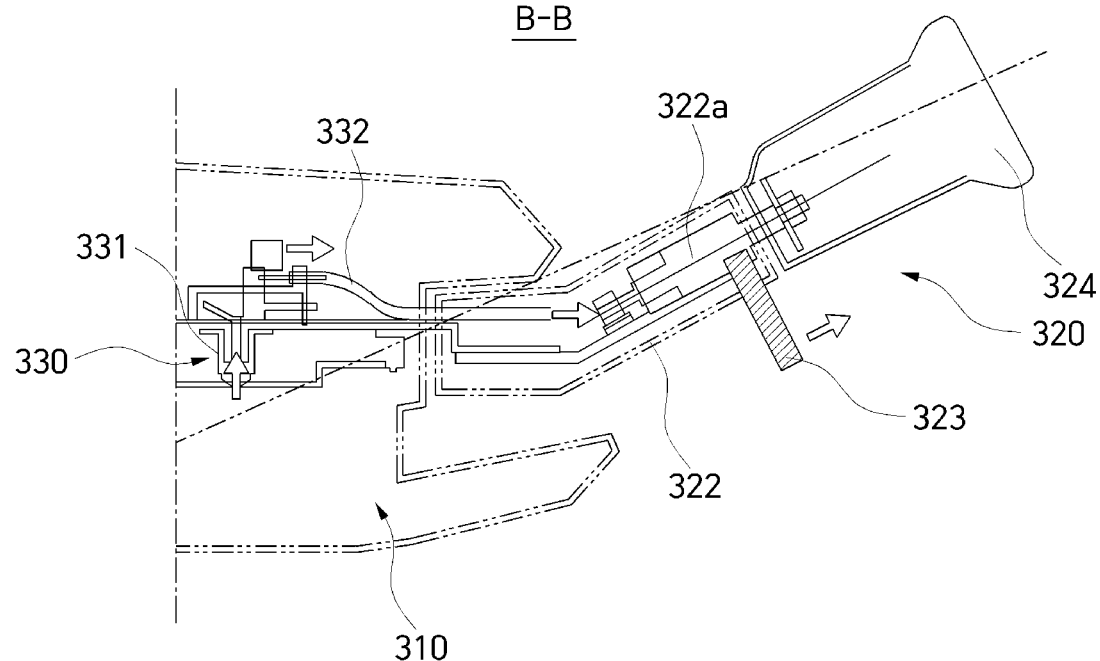
FIG. 24 is a cross-sectional view taken along line B-B' of FIG. 23.
Figure 25:
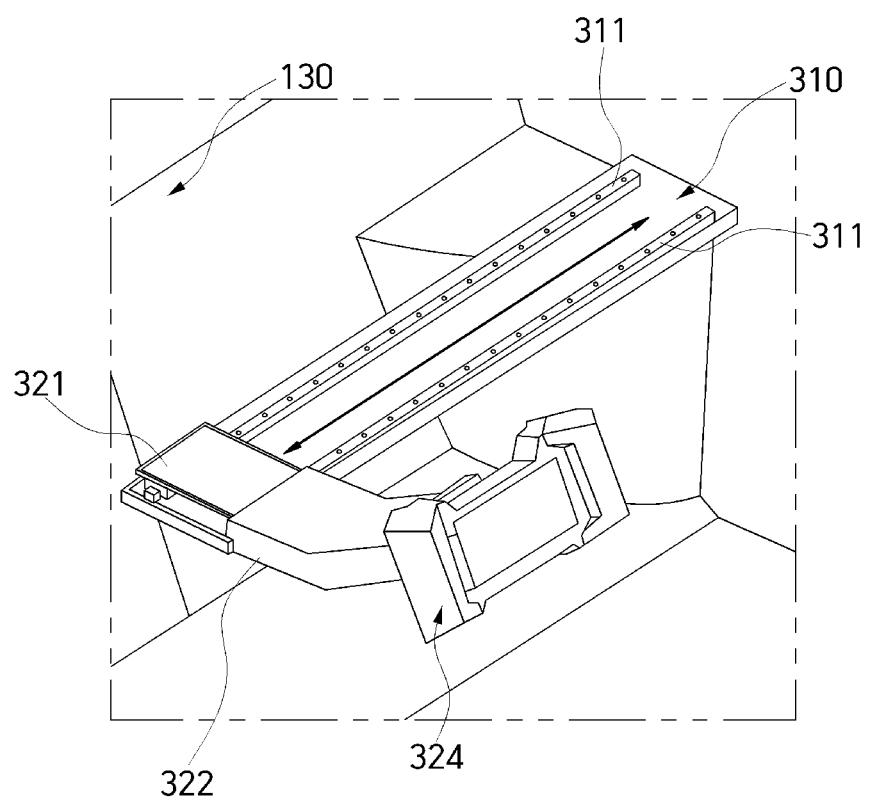
FIG. 25 is a diagram illustrating the operation relationships among components of the steering device in the smart mobility vehicle in accordance with the embodiment of the present disclosure.
Figure 26:
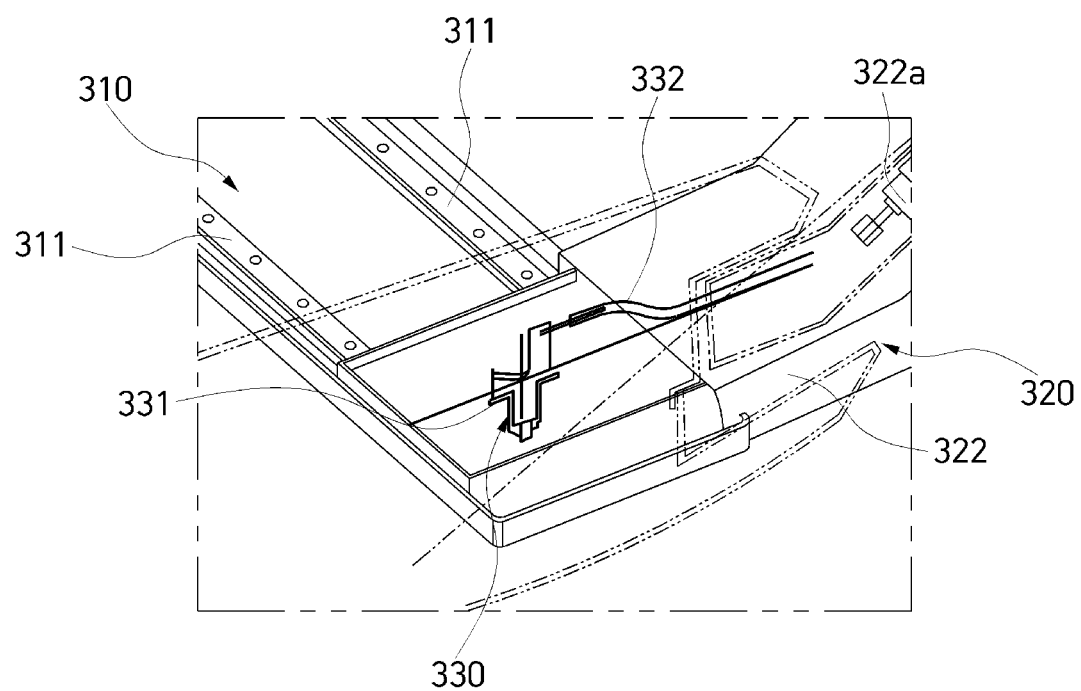
FIG. 26 is a diagram partially illustrating the operation relationships among the components of the steering device in the smart mobility vehicle in accordance with the embodiment of the present disclosure.

FIG. 23 is a diagram schematically illustrating the steering device in the smart mobility vehicle in accordance with the embodiment of the present disclosure, FIG. 24 is a cross-sectional view taken along line B-B' of FIG. 23, and FIGS. 25 and 26 are diagrams each illustrating the operation relationships among the components of the steering device.

The steering wheel part 320 illustrated in FIGS. 23 to 26 can be locked or rotated through a paddle shift type of steel wire connection. The steering wheel part 320 includes a base plate 321, a casing 322, a lever 323 and a steering wheel 324.

The base plate 321 can be moved from side to side along the cockpit module 310. That is, the base plate 321 is connected so as to be movable on a plurality of rail brackets (311 of FIG. 22) formed in the longitudinal direction of the cockpit module 310.

The casing 322 is connected to the rear of the base plate 321 so as to be bent upward. Such a casing 322 has a connector 322a embedded therein.

The lever 323 has a structure which is interlocked with the locking part 330, and protrudes from a part of the bottom of the casing 322.

The steering wheel 324 is connected to the rear of the casing 322.

The mechanical locking structure of the steering wheel part 320 will be described with reference to FIG. 24. The locking part 330 includes a fixing member 331 and a wire 332. The fixing member 331 is moved upward and downward on the base plate 321, and fixes or releases the steering wheel part 320 to or from the cockpit module 310, and the wire 332 connects the fixing member 331 and the connector 322a of the casing 322.

When the lever 323 is pulled to the rear (toward the driver seat), the connector 322a interlocked with the lever 323 pulls the wire 332 to the rear, and the fixing member 331 connected to the wire 332 is moved upward to unlock the steering wheel part 320.

At this time, the steering wheel part 320 may be unlocked from the cockpit module 310 through an electric method using a solenoid or actuator, not the mechanical method.

For example, the steering wheel part 320 may be unlocked through a simple button operation, or unlocked according to a preset condition while connected to smart devices (e.g. portable terminals or the like) of the occupants on a driver seat and a passenger seat. The steering wheel 324 of the steering wheel part 320 may be moved by a predetermined distance through position switching, and then locked as in the initial state.

Figure 27:
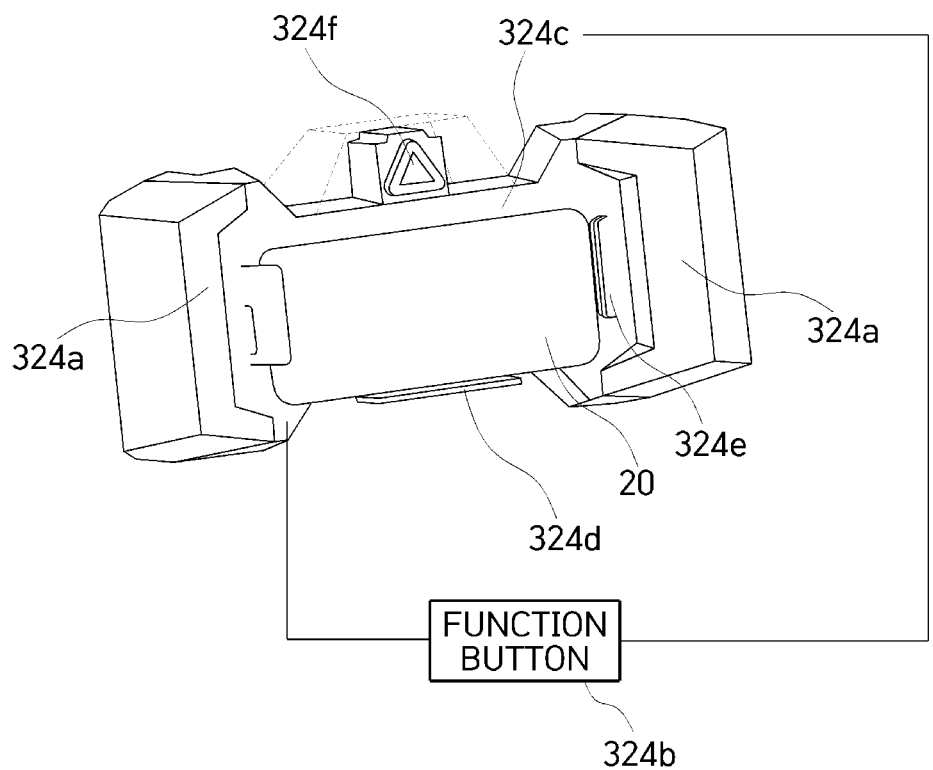
FIGS. 27 and 28 are diagrams schematically illustrating a steering wheel in the steering device of the smart mobility vehicle in accordance with the embodiment of the present disclosure.
Figure 28:
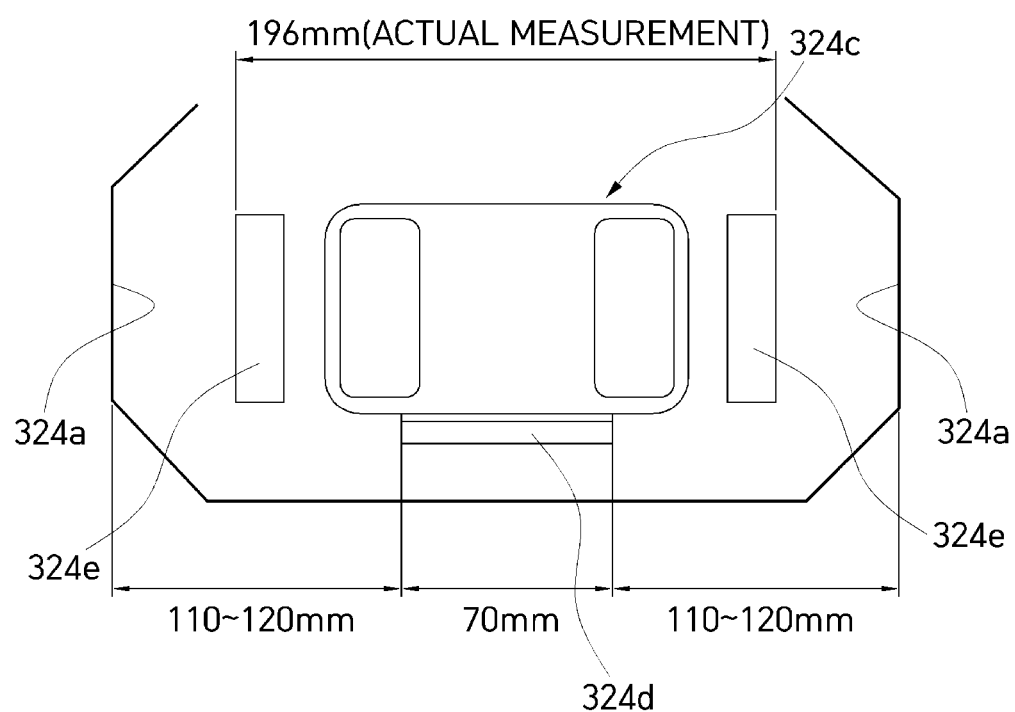

FIGS. 27 and 28 are diagrams schematically illustrating the steering wheel in the steering device of the smart mobility vehicle in accordance with the embodiment of the present disclosure.

Referring to FIGS. 27 and 28, the steering wheel 324 includes a grip part 324a, a function button part 324b, a center part 324c, a support part 324d, a fixing part 324e, and a hazard switch 324f.

The steering wheel 324 may include the function button part 324b configured in a paddle shift type so as to control the locking operation of the locking part (330 of FIG. 24).

The center part 324c is steerably connected to the rear of the casing (322 of FIG. 24), and provides a holding space for holding a portable terminal 20. When the portable terminal 20 is held on the holding space of the center part 324c, the portable terminal 20 may be paired with the vehicle through a vehicle control-related application installed in the portable terminal 20. Through the pairing, a user (including an occupant) may select a desired option by touching the portable terminal 20 with the steering wheel 324 held on the user's hand. The grip part 324a is formed at either end of the center part 324c, and provides a finger grip space of the user.

At this time, the center part 324c is electrically (in a wired/wireless manner) connected to the smart mobility vehicle. When the portable terminal 20 is held on the holding space, the portable terminal 20 may be automatically paired with the smart mobility vehicle according to preset terminal information.

The support part 324d is disposed at the bottom of the center part 324c, and supports the portable terminal 20.

The fixing part 324e is disposed between either end of the center part 324c and the grip part 324a, and fixes the portable terminal 20. At this time, the fixing part 324e may be formed in a hinge-connected clamp type, or have a separate buffer member (not illustrated) disposed in a section where the fixing part 324e comes into contact with the portable terminal 20, in order to fix the portable terminal 20.

The steering wheel 324 illustrated in FIG. 28 has the following dimensional information: the side-to-side length of the steering wheel 324 is about 196 mm, the distance between one end of the support part 324d and the left grip part 324a ranges from 110 to 120 mm, and the distance between the other end of the support part 324d and the right grip part 324a ranges from 110 to 120 mm.

Here, the side-to-side length of the support part 324d may be about 70 mm. The dimensional information between the components of the steering wheel 324 illustrated in FIG. 28 is only an example, and the present disclosure is not limited to such numerical values. However, the dimension ratio between the corresponding components may be significant.

Figure 29:
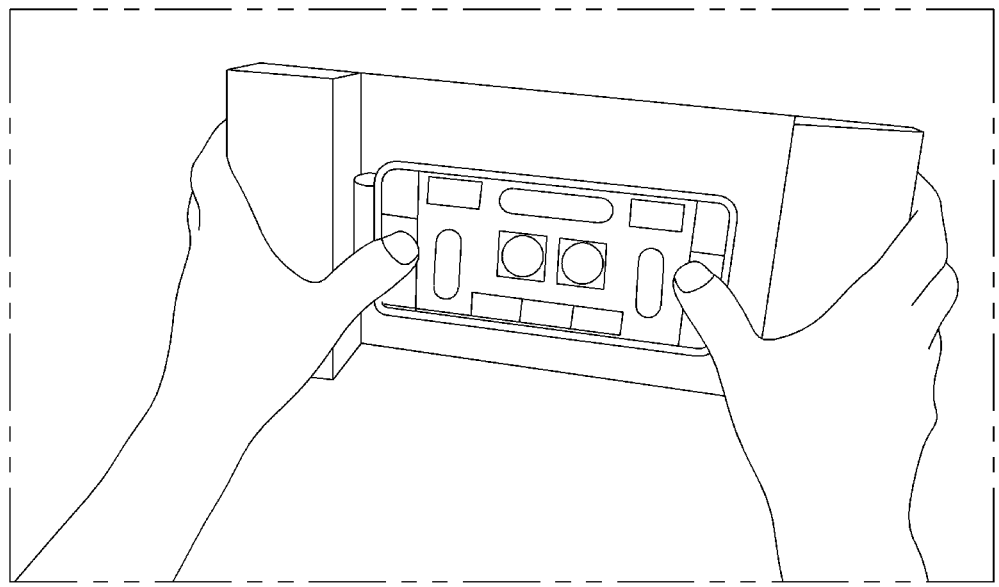
FIGS. 29 and 30 are diagrams schematically illustrating the prototype of the steering wheel in the steering device of the smart mobility vehicle in accordance with the embodiment of the present disclosure.
Figure 30:
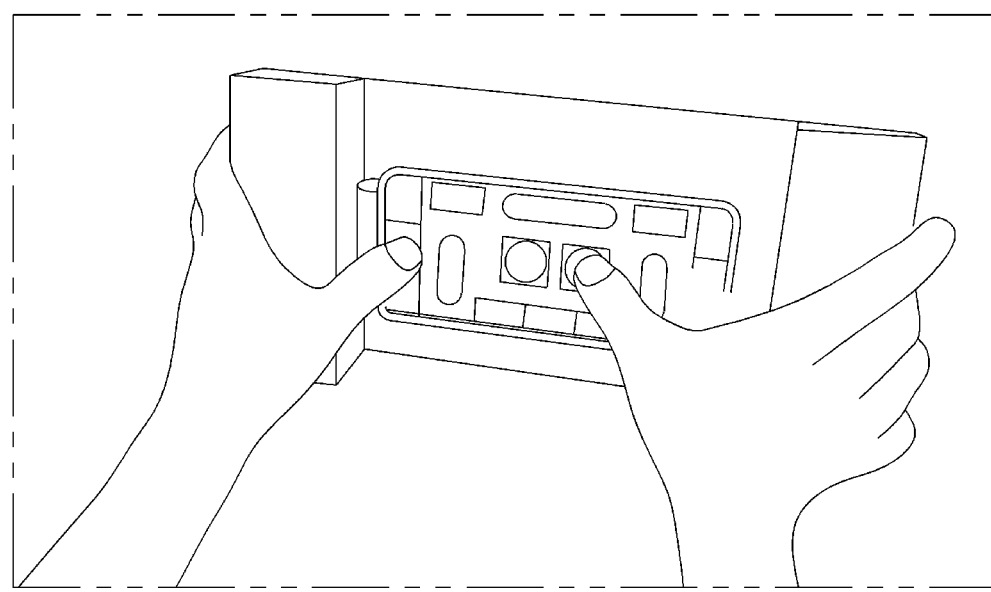

FIGS. 29 and 30 schematically show the prototype of the steering wheel in the steering device of the smart mobility vehicle in accordance with the embodiment of the present disclosure.

The steering wheel 324 illustrated in FIGS. 29 and 30 may be a steering wheel which is manufactured in a prototype in consideration of a grip condition of the steering wheel 324 during driving and a condition in which a user can manipulate the screen of a portable terminal.

Under the corresponding condition, the following consideration needs to be taken into account: the user needs to easily touch or manipulate the screen of the portable terminal by using his/her thumb with the steering wheel 324 held by the user's hand.

Furthermore, the grip part (324a of FIG. 27) of the steering wheel 324 needs to enable the user to easily grip the portable terminal placed on the center part (324c of FIG. 27). The dimensional information of the steering wheel based on the corresponding condition may be set to the values illustrated in FIG. 28. As described above, the present disclosure is not limited to the dimensional information, but the dimension ratio between the corresponding components may be significant.

The arrangement of function buttons on an application within the portable terminal may be changed according to a user's settings, such that the user easily manipulates the portable terminal with the portable terminal placed on the steering wheel 324.

Occupant Recognition-Based Image Display Control Device and Method (FIGS. 31 to 40)

Figure 31:
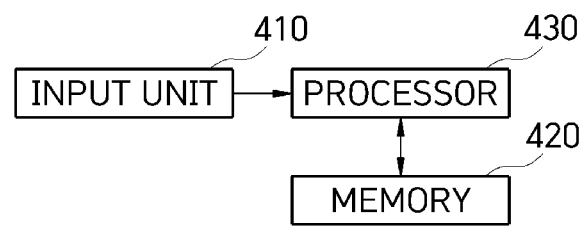
FIG. 31 is a diagram illustrating an occupant recognition-based image display control device of the smart mobility vehicle in accordance with the embodiment of the present disclosure.

FIG. 31 is a diagram illustrating an occupant recognition-based image display control device in accordance with an embodiment of the present disclosure.

The occupant recognition-based image display control device in accordance with the embodiment of the present disclosure includes an input unit 410, a memory 420 and a processor 430. The input unit 410 is configured to receive occupant recognition information, the memory 420 is configured to store a program for controlling an image display within the vehicle by using the occupant recognition information, and the processor 430 is configured to execute the program. The processor 430 transmits a command signal to change a partial area of an image display area within the vehicle to an area which does not block an occupant's view, by using the occupant recognition information.

The input unit 410 receives the occupant recognition information including one or more of the eye position and the head position of an occupant.

The processor 430 transmits a command signal for lowering the partial area by using the occupant recognition information.

The processor 430 transmits a driving command signal to an actuator connected to a reflecting mirror, and rotates the reflecting mirror such that a projection image based on image contents for a passenger is formed on the dashboard area.

When the difference between the eye or head positions of the driver and the passenger is out of a preset range, the processor 430 transmits the command signal to lift the partial area.

The input unit 410 receives information related to the state in which the height of a cockpit is adjusted, and the processor 430 transmits the command signal to adjust the partial area of the image display area within the vehicle by using the occupant recognition information and the information related to the state in which the height of the cockpit is adjusted.

The processor 430 transmits an electrochromic film control signal to adjust the transparency of an empty space which occurs as the partial area of the image display area within the vehicle is changed.

Figure 32:
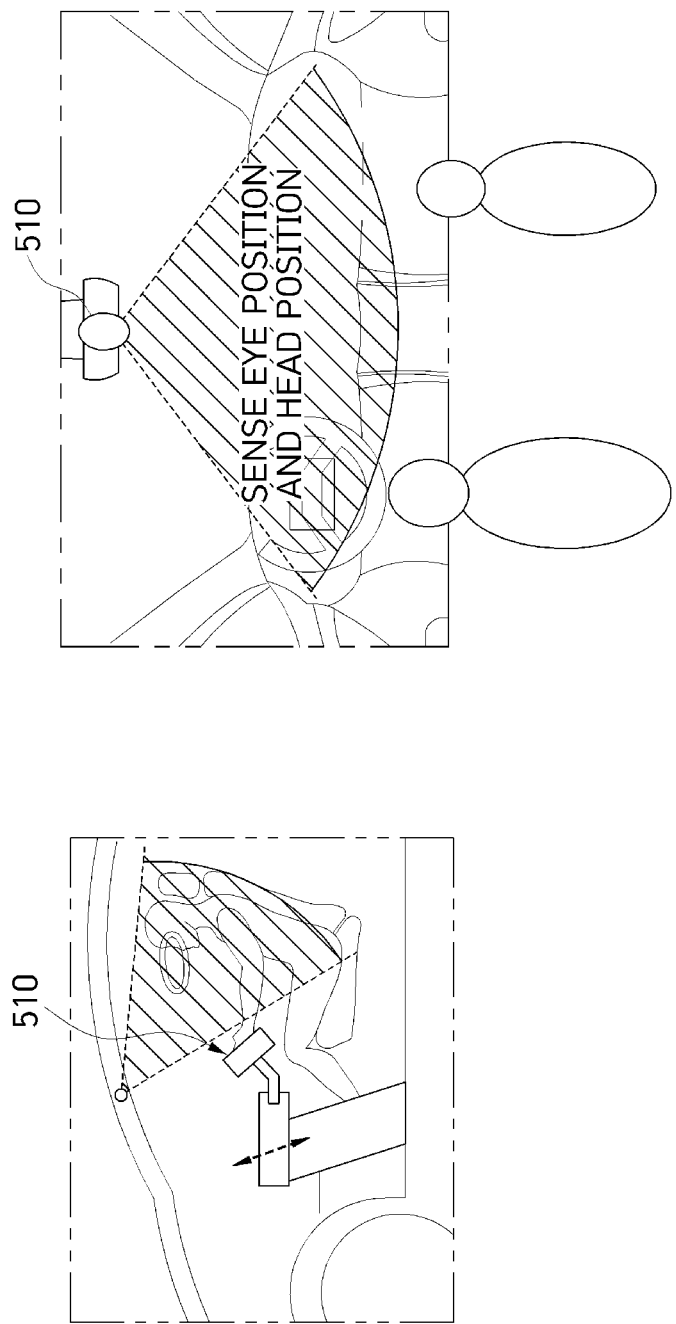
FIG. 32 is a diagram illustrating an occupant sensing process in the smart mobility vehicle in accordance with the embodiment of the present disclosure.

FIG. 32 illustrates an occupant sensing process in accordance with an embodiment of the present disclosure.

Referring to FIG. 32, the eye position or body (head) position of an occupant is sensed by an in-vehicle monitoring device 510 such as an IR camera or ToF camera.

The processor 430 receives information on the eye position or body position of the occupant as occupant information, and transmits a display position adjustment-related command signal for the internal display in consideration of the occupant information.

The processor 430 acquires information on the occupant's height when seated (sitting height), and the eye position and the FOV of the occupant, by using the occupant information.

Furthermore, the processor 430 may receive occupant information from a separate sensor (e.g. a weight sensor mounted in a seat), and recognize whether the occupant is an adult or kid.

At this time, the processor 430 decides display position coordinate information of the internal display according to the occupant information of each occupant and transmits a command signal, or transmits a command signal for display position coordinate information of the internal display based on a preset category to which the occupant information of each occupant belongs.

For example, suppose that the position of the partial area of the display area within the vehicle is adjusted, when the eye position of a passenger A is a position A-1 (1 m in a vertical direction z from a preset reference point within the vehicle) and the eye position of a passenger B is a position B-1 (0.8 m in the vertical direction z from the preset reference point within the vehicle). Hereafter, the position adjustment will be described in detail with reference to FIGS. 7 to 9.

For example, it is assumed that, when the eye position of a passenger corresponds to a preset position (e.g. 1 m or less in the vertical direction z from the preset reference point within the vehicle), the position of the partial area of the display area is adjusted in proportion to the eye position. In this case, a position adjustment reference value may be set to 5 cm.

At this time, the center position of the above-described partial area in the case of the passenger A can be lifted by 5 cm from the existing display position, and the center position of the partial area in the case of the passenger B can be lifted by 6 cm from the existing display position.

For another example, when a first classification in which the center position of the partial area is lifted by 5 cm from the display position in the case that the eye position of the passenger is 1 m or less in the vertical direction z from the preset reference point within the vehicle and a second classification in which the center position of the partial area is lifted by 7 cm from the display position in the case that the eye position of the passenger is 0.7 m or less in the vertical direction z from the preset reference point within the vehicle are set according to the eye position of the passenger, the processor 430 determines that both of the passengers A and B correspond to the first classification, and lifts the center position of the partial area by 5 cm from the existing display position.

The processor 430 transmits a command signal to adjust the display position of the internal display area in overall consideration of the height adjustment information of the cockpit and the occupant information.

That is, the processor 430 determines whether the occupant's view is blocked, by using the occupant information and the height adjustment information of the cockpit, and transmits a command signal to adjust the display position of the partial area of the internal display area, according to the determination result.

The projector having received the command signal adjusts the display position of the partial area of the internal display area, or the actuator having received the command signal drives (rotates and unfolds) the reflecting mirror to adjust the area on which a projection image is formed.

Furthermore, in order to prevent the driver's view from being blocked as the display position of image contents is adjusted, the processor 430 sets a position adjustment limit value for the partial area of the internal display area, and transmits a command signal related to the display position adjustment.

For example, the height of the partial area of the internal display area in front of the passenger seat is set to a value that cannot rise to a preset limit value (e.g. 20 cm) or more.

Figure 33A:
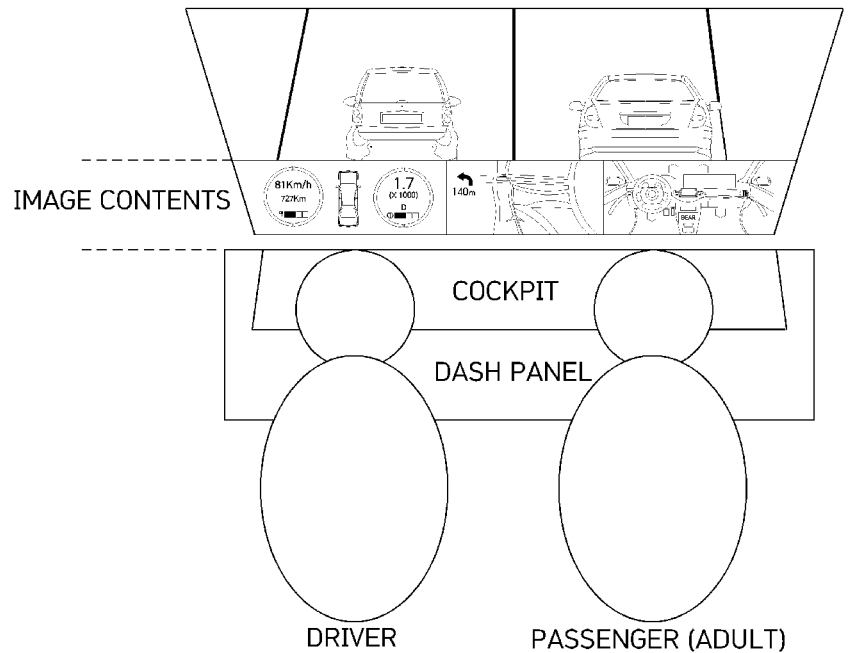
FIGS. 33A to 39B are diagrams illustrating that the position of an image is moved in the smart mobility vehicle in accordance with the embodiment of the present disclosure.

FIGS. 33 to 39 illustrate that the position of an image is moved, in the smart mobility vehicle in accordance with the embodiment of the present disclosure FIG. 33A illustrates a situation in which a driver is seated on the left front seat of the vehicle, and a passenger (adult) is seated on the right front seat of the vehicle.

Figure 33B:
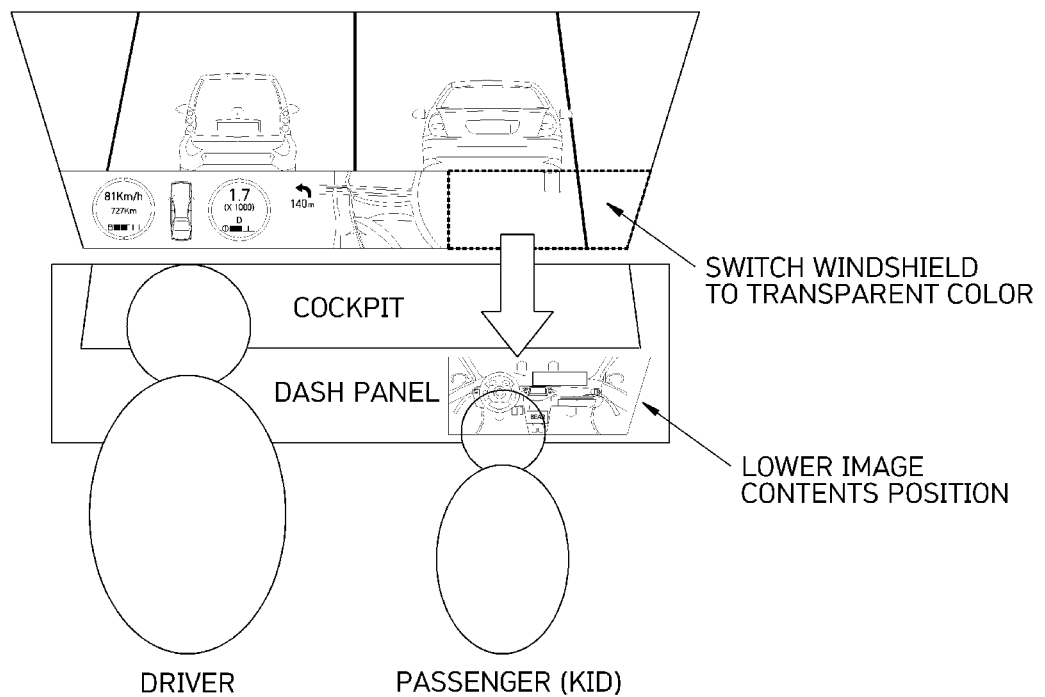

FIG. 33B illustrates a situation in which a driver is seated on the left front seat of the vehicle, and a passenger (kid) is seated on the right front seat of the vehicle.

Figure 33C:
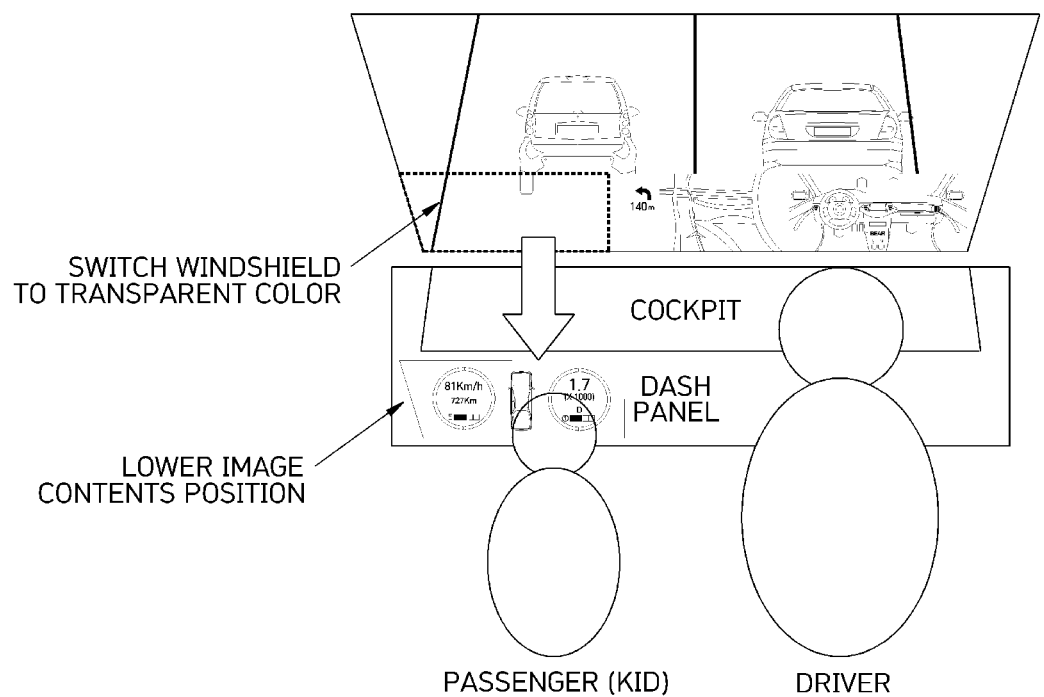

FIG. 33C illustrates a situation in which a driver is seated on the right front seat of the vehicle, and a passenger (kid) is seated on the left front seat of the vehicle.

FIG. 33A illustrates the occupants' views and a situation in which the dashboard is disposed over the floor within the vehicle, the cockpit is disposed over the dashboard, and image contents are displayed on a preset area (internal display area) within the windshield.

At this time, the internal display area is divided into a preset number of partial areas (e.g. three areas in FIG. 33), and the cockpit has an adjustable height.

Suppose that the internal display area is divided into a first area (cluster information display), a second area (navigation information display) and a third area (image contents display for passenger) from the front of the driver seat toward the passenger seat.

FIGS. 33B and 33C illustrate a situation in which an adult is seated on the driver seat, and a kid (short person) is seated on the passenger seat.

As described above, it is assumed that the cockpit has an adjustable height, and the projection area and the image position have been adjusted on the basis of the driver.

At this time, the processor 430 transmits a command signal to lower the display position of image contents in the third area in consideration of the cockpit position information and the occupant information, such that the image contents of the third area are displayed on a partial area of the dashboard area. Thus, the kid as a passenger can easily watch the image contents of the third area at the adjusted position of the internal display area.

At this time, as will be described below, the processor 430 may transmit a command signal to the actuator which changes the angle of the reflecting mirror, and control the projector to project the image contents onto the surface of an internal trim panel, such that the kid seated on the passenger seat can check the image contents.

This process uses the principle that the display area is divided into the internal display area and the external display area, and an image projected from the inside is formed on the surface (display panel) such that the image contents can be checked from the opposite side (passenger position).

As illustrated in FIGS. 33B and 33C, the processor 430 may transmit a control signal to the electrochromic film of the windshield to change the transparency of an area whose position has been moved so that the image contents for a passenger no longer needs to be displayed, thereby additionally securing visibility for the outside.

The image contents for a passenger and the size of the image contents for a passenger as well as the position of the image contents for a passenger can be changed, and each of the display areas can be independently controlled.

In accordance with the embodiment of the present disclosure, the size of the initial projection image can be adjusted, and the contents can be changed through mirroring or independent screen configuration.

Figure 34A:
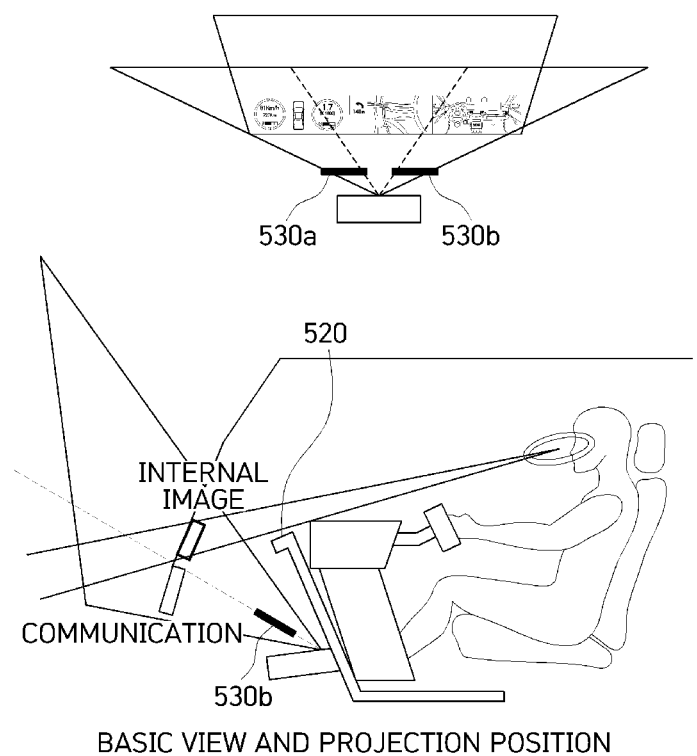
Figure 34B:
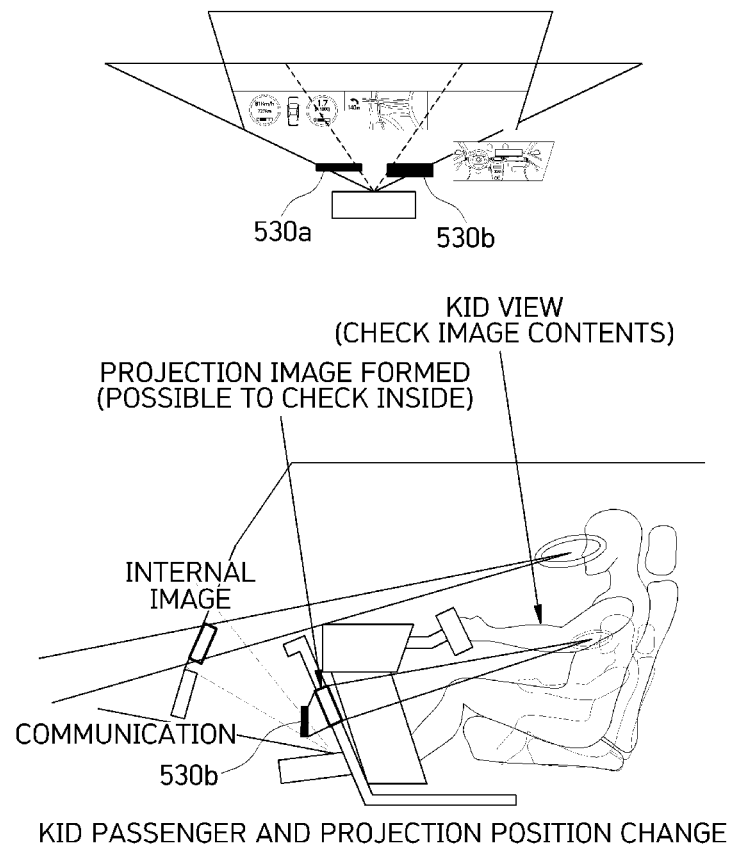

FIG. 34A illustrates a default field of view and a projection position, and FIG. 34B illustrates a change in projection position when a kid is seated on the passenger seat.

The reflecting mirror is provided as a pair of reflecting mirrors 530a and 530b. This configuration considers that the driver seat and the passenger seat can be changed, because the steering wheel is movable from the left front seat to the right front seat of the vehicle.

That is, the reflecting mirror is provided as first and second reflecting mirrors 530a and 530b installed in the driver seat and the passenger seat, and configured to adjust the contents area when the driver seat is changed as the steering wheel is moved from side to side.

Referring to FIGS. 34A and 34B, a dashboard 520 has a partial surface area made of a translucent material, and maintains an opaque exterior when there is no lighting.

Referring to FIG. 34A, an internal image is projected onto the internal display area of the vehicle, and an external image (communication) is projected onto the external display area of the vehicle.

In the case of the default field of view illustrated in FIG. 34A, the angle of the second reflecting mirror 530b is controlled in parallel to the projection direction, and the first and second reflecting mirrors 530a and 530b are mounted on areas which do not interfere with the internal image projection and the external image projection, respectively.

When a kid is seated on the passenger seat as illustrated in FIG. 34B, the processor 430 transmits a driving command signal to an actuator connected to the second reflecting mirror 530b in consideration of the cockpit position adjustment information and the occupant information.

The second reflecting mirror 530b driven by the actuator is rotated and unfolded to form a projection image of the image contents for a passenger on the dashboard 520 in front of the passenger seat (passenger seat contents image reflection).

Figure 35A:
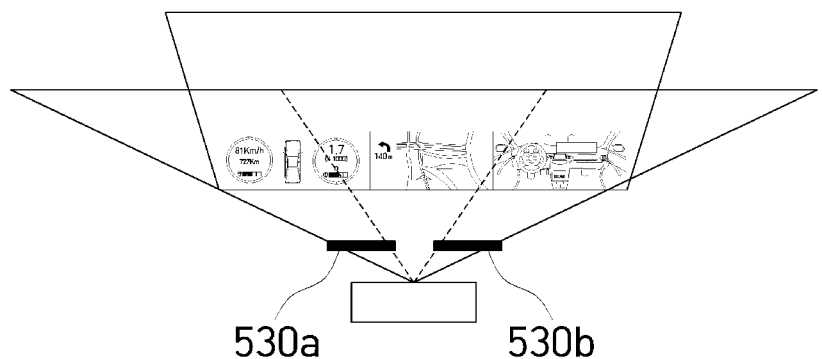

FIG. 35A illustrates that the first and second reflecting mirrors 530a and 530b are separately applied to the driver seat and the passenger seat, respectively, as described above.

Figure 35B:
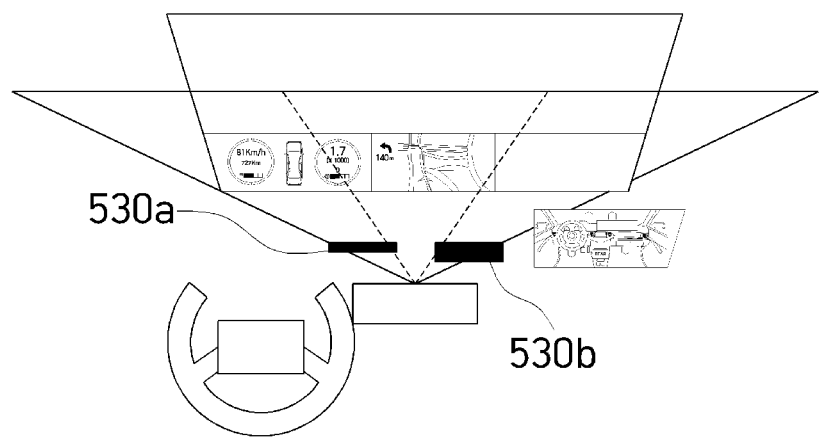
Figure 35C:
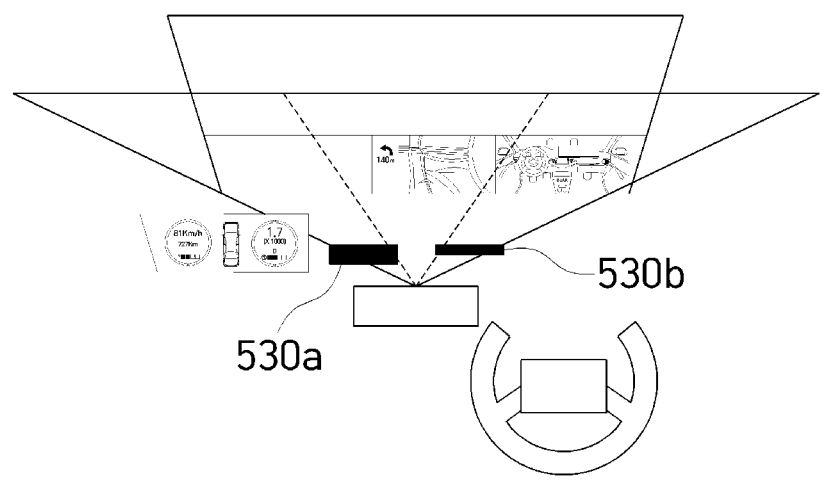

As illustrated in FIGS. 35B and 35C, the position of the passenger seat is decided as the steering wheel is moved to the left or right. When a passenger seated on the passenger seat is a kid, the processor 430 decides whether to display image contents for a passenger by rotating any one reflecting mirror to some extents, in consideration of the cockpit position information (the position information of the cockpit whose height has been adjusted) and the occupant information (the view information of the occupant), and transmits a driving command signal to the actuator to display the image contents.

As the actuator is driven, the second reflecting mirror 530b is rotated (FIG. 35B) when the right front seat of the vehicle is the passenger seat, and the first reflecting mirror 530a is rotated (FIG. 35C) when the left front seat of the vehicle is the passenger seat.

Referring to FIGS. 36A to 36D, a reflecting mirror 530 in accordance with the embodiment of the present disclosure is disposed on a sliding and rotating bar 540 which can be rotated and moved straight from side to side, and located at the opposite position of the steering wheel.

Figure 36A:
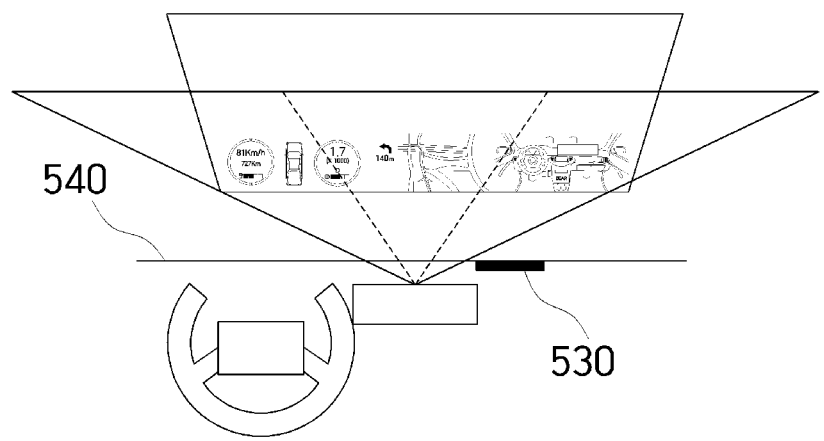
Figure 36B:
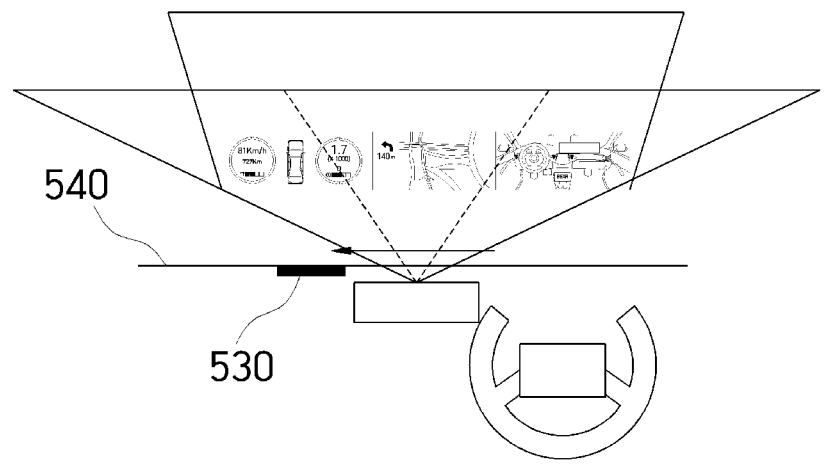

That is, when the steering wheel is disposed at the left front seat of the vehicle as illustrated in FIG. 36A, the reflecting mirror 530 is located at the right front seat of the vehicle, and when the steering wheel is moved to the right front seat of the vehicle as illustrated in FIG. 36B, the reflecting mirror 530 is moved to the left front seat of the vehicle by the sliding and rotating bar 540.

Figure 36C:
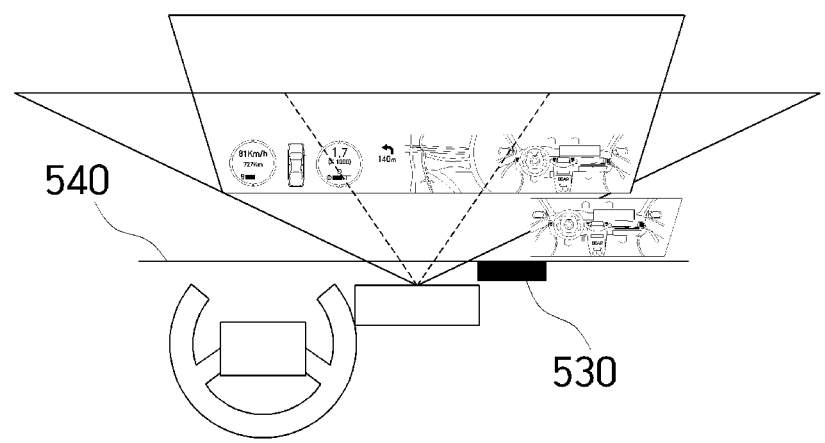
Figure 36D:
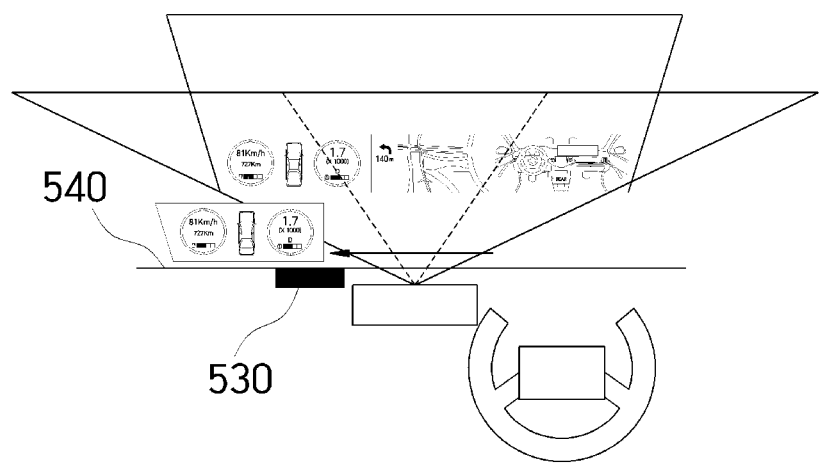

When a kid is seated on the passenger seat as illustrated in FIGS. 36C and 36D, the processor 430 transmits a driving command signal to rotate the reflecting mirror 530 by using the cockpit position information and the occupant information, and displays the image contents for a passenger on the dashboard as described above.

Figure 37A:
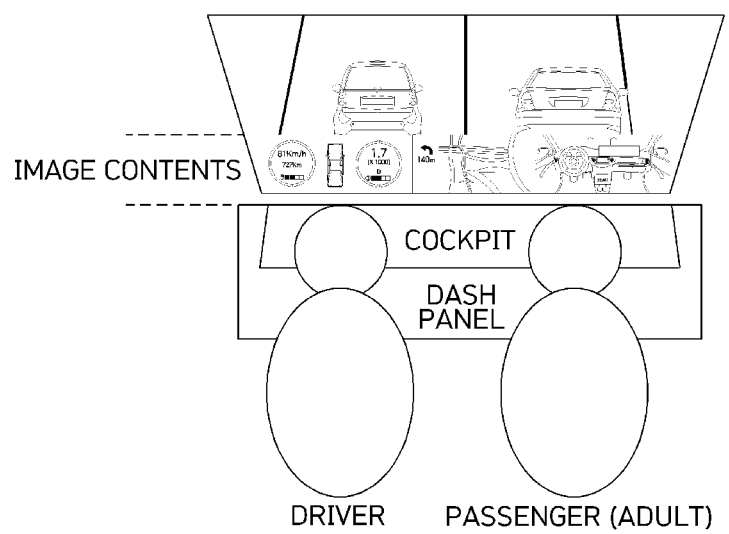
Figure 37B:
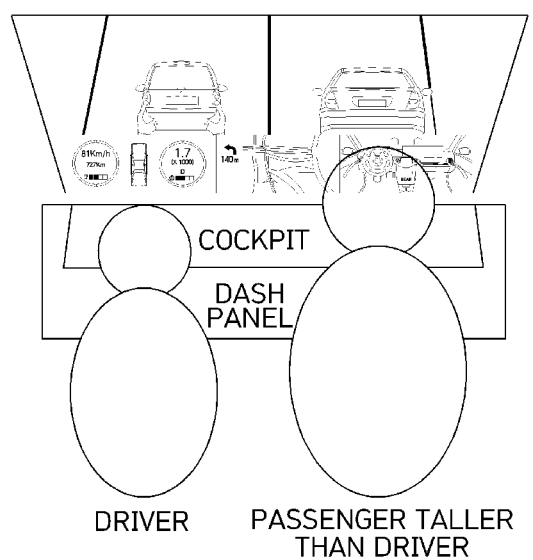
Figure 37C:
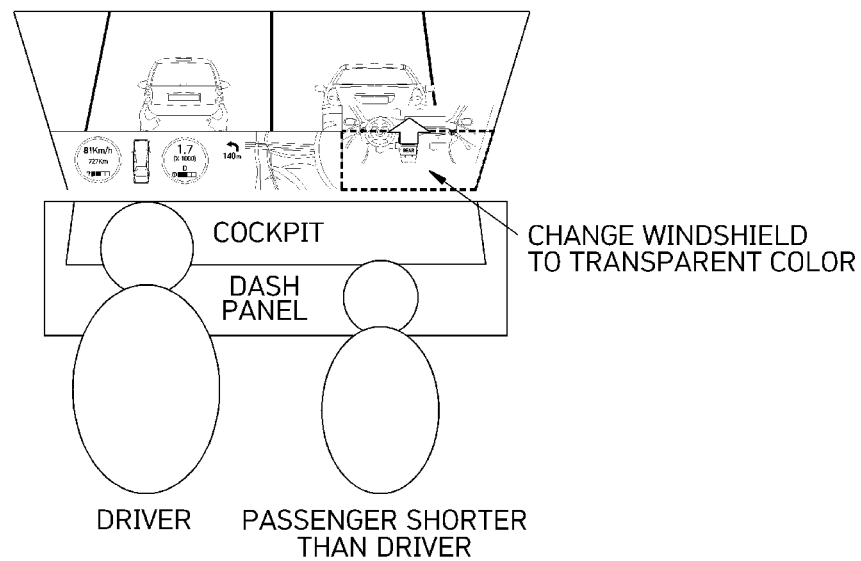

FIG. 37A illustrates that a driver and a passenger (adult), who have a similar eye height, are seated in the vehicle, FIG. 37B illustrates that a driver and a passenger who is taller than the driver are seated in the vehicle, and FIG. 37C illustrates that a driver and a passenger who is shorter than the driver are seated in the vehicle.

Referring to FIGS. 37A and 37B, when the difference between the eye positions or head positions of the driver and the passenger falls within a preset range, the internal display area is maintained.

Referring to FIG. 37C, when the passenger is shorter than the driver such that the difference between the eye positions or head positions of the driver and the passenger is out of the preset range, the position of a contents display area for a passenger in the internal display area is adjusted.

In accordance with the embodiment of the present disclosure, when the position of the cockpit having an adjustable height is changed to a higher position than the existing position thereof because a tall driver is seated in the vehicle, the display position of the internal display area is moved to a higher position than the existing position thereof. Thus, since the view of the passenger shorter than the driver is blocked with respect to the contents display area for a passenger, the processor 430 transmits a command signal to lift the contents display area for a passenger.

That is, when the passenger is shorter than the driver such that the third area is blocked by the cockpit, the processor 430 transmits the control command signal to lift the display area of the third area.

At this time, as described above with reference to FIGS. 33B and 33C, the processor 430 transmits the control signal to the electrochromic film of the windshield, such that the color of the area on which the image contents for a passenger are no longer displayed due to the position movement is changed to a transparent color, thereby additionally securing the visibility for the outside.

Figure 38A:
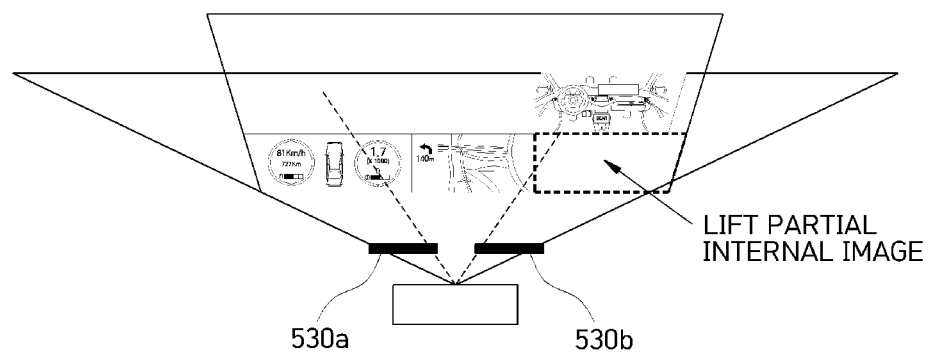
Figure 38B:
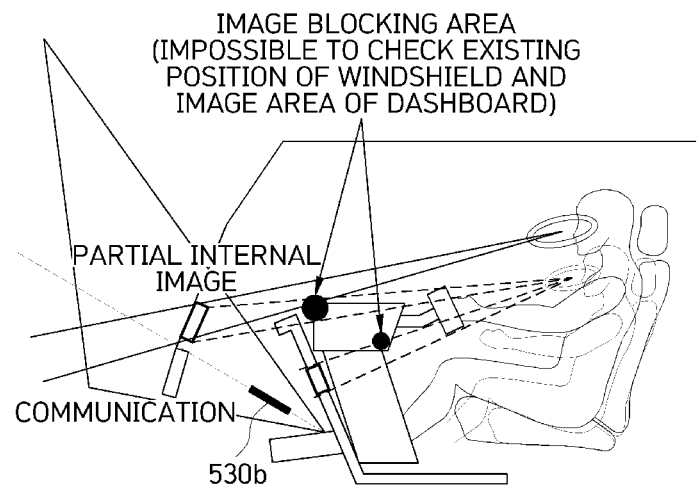

FIG. 38A is a front view illustrating the positions of the first and second reflecting mirrors 530a and 530b. FIG. 38B illustrates that the position of the windshield and the image area of the dashboard cannot be checked from a passenger's view due to an image blocking area.

That is, when the image contents for a passenger are displayed on the third area covered by the cockpit because the passenger is shorter than the driver, the third area is partially lifted, and the image contents are lifted and displayed.

Figure 38C:
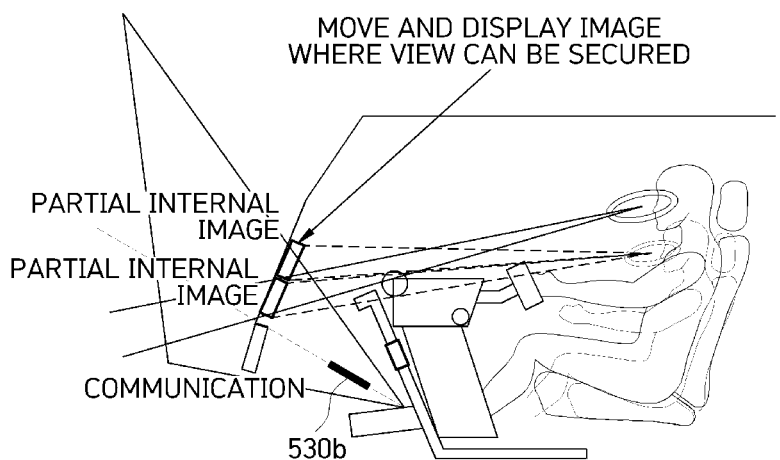

At this time, as illustrated in FIG. 38C, the second reflecting mirror 530b is not rotated but fixed, and only the image area (third area) is adjusted to change and display image contents, such that the image contents are moved to and displayed on an area where the passenger's view can be secured.

Figure 39A:
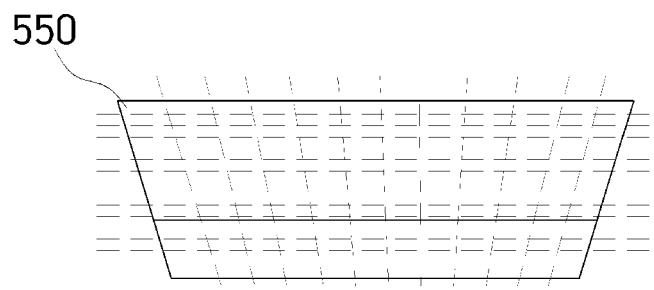

Referring to FIG. 39A, an electrochromic film is disposed on the image display area of a windshield 550, and an electrochromic section is subdivided so that transparent/opaque positions are adjusted in connection with contents control.

As the electrochromic film has a power application section subdivided into a plurality of sections, the concentration of each section can be adjusted, and an image is outputted onto the section whose concentration has been adjusted, through the projector or the like.

Figure 39B:
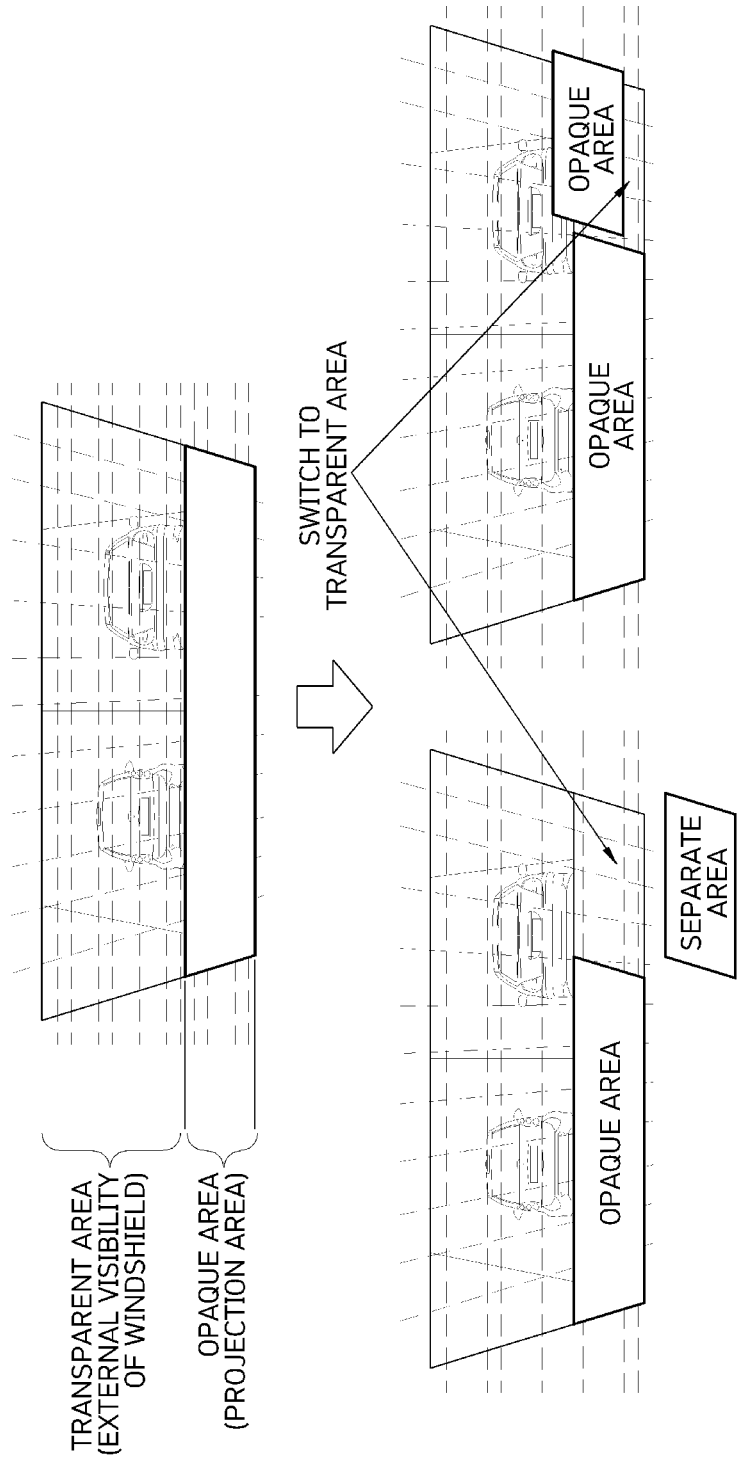

Referring to FIG. 39B, when the position of a partial area of a projection image is moved within the windshield as described above, the partial area may be changed to an empty space and become transparent to secure the visibility to the outside.

Figure 40:
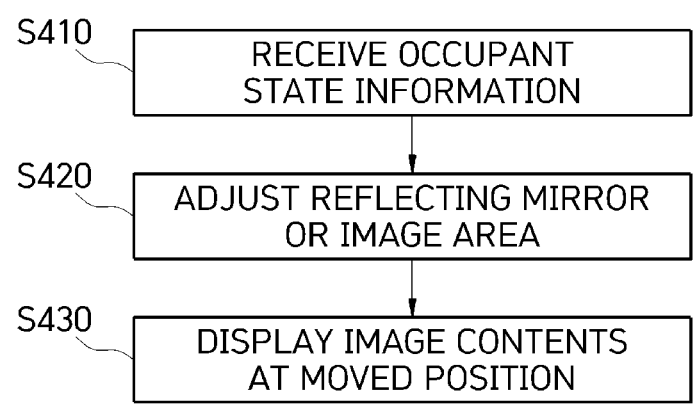
FIG. 40 is a flowchart illustrating an occupant recognition-based image display control method of the smart mobility vehicle in accordance with the embodiment of the present disclosure.

FIG. 40 is a diagram illustrating an occupant recognition-based image display control method in accordance with an embodiment of the present disclosure.

The occupant recognition-based image display control method in accordance with the embodiment of the present disclosure includes step S410 of receiving occupant state information of a driver and a passenger within a vehicle, step S420 of adjusting a reflecting mirror by using the occupant state information, or adjusting the display position of a display area within the vehicle, and step S430 of displaying image contents at the decided position.

In step S410, the occupant state information including at least any one of the eye positions and the head positions of the driver and the passenger is received.

In step S420, a command signal for adjusting the reflecting mirror is transmitted to lower a partial area of the display area within the vehicle by using the occupant state information.

In step S430, as the reflecting mirror is rotated, a projection image based on image contents for a passenger is displayed on a dashboard area.

In step S420, the display position of the partial area of the display area within the vehicle is lifted to an area where the passenger's view is not blocked, on the basis of the occupant state information.

In step S410, adjustment information on a cockpit having an adjustable height is further received. In step S420, the display position of the display area within the vehicle is adjusted on the basis of the adjustment information and the occupant state information.

The occupant recognition-based image display control method in accordance with the embodiment of the present disclosure further includes a step of transmitting a control signal to change the transparency of an electrochromic film of an area on which image contents have been displayed, when the area is changed to an empty space.

The occupant recognition-based image display control method in accordance with the embodiment of the present disclosure may be implemented in a computer system or recorded in a recording medium. The computer system may include one or more processors, a memory, a user input device, a data communication bus, a user output device and a storage place. The above-described components perform data communication through the data communication bus.

Various embodiments are directed to a smart mobility vehicle which can display various types of messages to the outside while providing an occupant's convenience, such that driving information can be shared.

In accordance with the embodiment of the present disclosure, the smart mobility vehicle may provide an occupant's convenience and simultaneously display various types of messages to the outside, such that driving information can be shared.

Furthermore, the smart mobility vehicle can more effectively display images onto internal and external displays through a short focal length projector capable of securing an FOV on a projection path.

Furthermore, the smart mobility vehicle has a structure in which a cockpit structure is moved so that occupants having different builds are comfortably seated in the vehicle during driving.

Furthermore, according to the build/position of an occupant, the smart mobility vehicle may selectively adjust the positions of the cockpit module and the steering wheel, thereby significantly improving the occupant's driving convenience.

The computer system may further include a network interface coupled to a network. The processor may be a CPU (Central Processing Unit), or a semiconductor device configured to process a command stored in the memory and/or the storage place.

The memory and the storage place may include various types of volatile or nonvolatile storage media. For example, the memory may include ROM and RAM.

Therefore, the occupant recognition-based image display control method in accordance with the embodiment of the present disclosure may be implemented as a method which can be executed in a computer. When the occupant recognition-based image display control method in accordance with the embodiment of the present disclosure is performed in a computer device, computer-readable commands may perform the occupant recognition-based image display control method in accordance with the embodiment of the present disclosure.

The occupant recognition-based image display control method in accordance with the embodiment of the present disclosure may be implemented as computer-readable codes in a computer-readable recording medium. The computer-readable recording medium includes all types of recording media storing data which can be decoded by a computer system. Examples of the computer-readable recording media may include a ROM, RAM, magnetic tape, magnetic disk, flash memory, optical data storage device and the like. Furthermore, the computer-readable recording media are may be stored and executed as codes which are distributed to computer systems connected through a computer communication network and read in a distributed manner While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A smart mobility vehicle comprising:
a windshield comprising an electrochromic film having adjustable transparency based on power applied thereto; and
a projector configured to project vehicle driving information onto the windshield,
wherein the windshield comprises an internal display area and an external display area, the internal display area being configured to display an image toward an inside of the vehicle, the external display area being configured to display an image toward an outside of the vehicle,
wherein the electrochromic film comprises:
an SPD (Suspended Particle Devices) film attached on the inner surface of the windsheild; and
a PDC (Polymer Dispersed Liquid Crystal) film attached to the inner surface of the SPD film.

2. The smart mobility vehicle of claim 1, wherein the internal display area is located at a higher level from the ground than the external display area.

3. The smart mobility vehicle of claim 1, wherein each of the internal and the external display areas have a separate power application path.

4. The smart mobility vehicle of claim 1, wherein the projector is a short focal length projector configured to project an image toward the internal and external display areas.

5. The smart mobility vehicle of claim 4, wherein the projector is disposed around a floor of the vehicle to secure an FOV (Field Of View) area, and to have a projection light path between the internal and external display areas.

6. The smart mobility vehicle of claim 4, wherein the projector is disposed in a cockpit of the vehicle to secure a field of view, and to have a projection light path between the internal and external display areas.

7. The smart mobility vehicle of claim 4, wherein the projector is disposed on an inner surface of a roof of the vehicle to secure a field of view, and to have a projection light path between the internal and external display areas.

8. The smart mobility vehicle of claim 7, wherein a reflecting mirror configured to adjust a position of an image projected onto the internal and external display areas is disposed on the projection light path.

9. A smart mobility vehicle comprising:
a windshield comprising an electrochromic film having adjustable transparency based on power applied thereto, and comprising an internal display area and an external display area; and
a projector configured to project vehicle driving information onto the windshield,
wherein a projection light path of the projector is adjusted between the internal and external display areas through position adjustment for each of the internal display area and the external display area,
wherein the electrochromic film comprises:
an SPD (Suspended Particle Devices) film attached on the inner surface of the windshield; and
a PDLC (Polymer Dispersed Liquid Crystal) film attached to the inner surface of the SPD film.

10. The smart mobility vehicle of claim 9, wherein an empty space that does not interfere with a peripheral object is formed around the projection light path.

11. The smart mobility vehicle of claim 9, wherein the projector is further configured to selectively adjust a projection area such that an image displayed on the external display area is not seen by a passenger.

12. A smart mobility vehicle comprising:
a console disposed in a dashboard of a vehicle;
a cockpit module disposed at the top of the console, the cockpit module being configured to be movable upward and downward; and
a steering wheel connected to the rear of the cockpit module, the steering wheel being configured to be movable from side to side in a longitudinal direction of the cockpit module.

13. The smart mobility vehicle of claim 12, wherein the console comprises:
a housing forming a body, and having a guide hole formed to extend in a top-to-bottom direction;
a slider configured to slide upward and downward on the guide hole of the housing;
an elastic member disposed at the bottom of the slider;
a locking member configured to limit movement of the slider; and
a lever connected to a rear of the slider,
wherein the lever is interlocked with the slider and the locking member through a reciprocal link structure, and is configured to unlock the slider locked by the locking member, in response to the lever being pulled to the rear of the slider.

14. The smart mobility vehicle of claim 13, further comprising:
a guide bracket configured to guide the upward and downward movement of the slider; and
a holder disposed at the bottom of the guide bracket,
wherein the slider is movably connected to the top of the guide bracket, and the elastic member is fixed to the bottom of the guide bracket.

15. The smart mobility vehicle of claim 14, wherein the guide bracket has an L-shaped cross-sectional structure.

16. The smart mobility vehicle of claim 14, wherein the holder has an upper portion which is inclined downward toward the front of the vehicle.

17. The smart mobility vehicle of claim 13, wherein the locking member is further configured to be moved to the outside in a lateral direction by a compression spring located on the inside in the lateral direction, and to unlock the slider, in response to the lever being pulled to the rear.

18. The smart mobility vehicle of claim 13, wherein the lever is disposed to not interfere with a side to side movement of the steering wheel.

19. The smart mobility vehicle of claim 13, wherein the housing is bent in an inclined manner upward toward the front, and is configured to guide the upward and downward movement of the cockpit module.

* * * * *